US012208993B2

(12) United States Patent
Lampe et al.

(10) Patent No.: US 12,208,993 B2
(45) Date of Patent: Jan. 28, 2025

(54) MULTI-FUNCTION STAIRLIFT CONNECTIVITY SYSTEM

(71) Applicant: Bruno Independent Living Aids, Inc., Oconomowoc, WI (US)

(72) Inventors: Kristopher O. Lampe, South Milwaukee, WI (US); Kelly A. Smith, Waukesha, WI (US); William Glase, Naperville, IL (US); Nicholas J. Scholtes, Shorewood, IL (US); Jeffery Hotz, Naperville, IL (US); Robert Visher, Downers Grove, IL (US)

(73) Assignee: BRUNO INDEPENDENT LIVING AIDS, INC., Oconomowoc, WI (US)

( * ) Notice: Subject to any disclaimer, the term of this patent is extended or adjusted under 35 U.S.C. 154(b) by 634 days.

(21) Appl. No.: 17/595,868

(22) PCT Filed: May 30, 2020

(86) PCT No.: PCT/US2020/035448
§ 371 (c)(1),
(2) Date: Nov. 29, 2021

(87) PCT Pub. No.: WO2020/243664
PCT Pub. Date: Dec. 3, 2020

(65) Prior Publication Data
US 2022/0315386 A1     Oct. 6, 2022

Related U.S. Application Data

(60) Provisional application No. 62/886,546, filed on Aug. 14, 2019, provisional application No. 62/855,059, filed on May 31, 2019.

(51) Int. Cl.
*B66B 9/08*     (2006.01)
*B66B 1/34*     (2006.01)
(Continued)

(52) U.S. Cl.
CPC .............. *B66B 9/08* (2013.01); *B66B 1/3461* (2013.01); *B66B 5/0025* (2013.01);
(Continued)

(58) Field of Classification Search
CPC ....... B66B 9/08; B66B 1/3461; B66B 5/0025; B66B 5/0031; B66B 9/0838; H02J 7/0042
See application file for complete search history.

(56) References Cited

U.S. PATENT DOCUMENTS 4,260,869 A     4/1981   Slavens et al.
4,838,412 A     6/1989   Backman
(Continued)

FOREIGN PATENT DOCUMENTS

CN     108787799 A     11/2018
EP       1124749 B1     3/2004
(Continued)

OTHER PUBLICATIONS

English machine translation of KR2001-0055394.
(Continued)

*Primary Examiner* — Jeffrey Donels
(74) *Attorney, Agent, or Firm* — Klintworth & Rozenblat IP LLP

(57) ABSTRACT

Multi-function stairlift connectivity includes a stairlift data collection system having data collection devices communicatively connected to a main controller. Such data collection devices may include sensors, switches, controllers, detectors, control boards, and location detectors providing data and settings in a stairlift (e.g., diagnostic information, system status data, faults, drive performance data). A communication module receives collected stairlift data and communicates wirelessly with a remote communication device. Waypoint detection may include stairlift carriage position detection employing electrical contacts on a stairlift car- (Continued)

riage. Carriage position can be determined when the carriage stops at or passes a waypoint marker that includes electrical contacts connected to a waypoint element possessing a detectable electromagnetic characteristic (e.g., an identifiable resistive value). Where resistive value are used, waypoint locations can be determined by using a different resistive value for each waypoint.

23 Claims, 21 Drawing Sheets

(51) Int. Cl.
*B66B 5/00* (2006.01)
*H02J 7/00* (2006.01)

(52) U.S. Cl.
CPC .......... *B66B 5/0031* (2013.01); *B66B 9/0838* (2013.01); *H02J 7/0042* (2013.01)

(56) References Cited

U.S. PATENT DOCUMENTS

| | | | |
|---|---|---|---|
| 4,904,916 A | 2/1990 | Glaske et al. | |
| 5,052,521 A | 10/1991 | Wendt et al. | |
| 5,235,917 A | 8/1993 | Luck et al. | |
| 5,676,061 A | 10/1997 | Loomer | |
| 6,082,496 A | 7/2000 | Bovis et al. | |
| 6,155,382 A | 12/2000 | Duijnstee | |
| 6,360,673 B1 | 3/2002 | Herrin et al. | |
| 6,435,308 B2 | 8/2002 | Grass | |
| 6,622,637 B2 | 9/2003 | Cummins | |
| 6,755,136 B2 | 6/2004 | Jenkins | |
| 6,761,250 B1 | 7/2004 | Szentisvany et al. | |
| 7,145,433 B2 | 12/2006 | Gerstenkorn | |
| 7,296,659 B2 | 11/2007 | Carlsen | |
| 7,322,461 B2 | 1/2008 | Szentisvany et al. | |
| 8,360,336 B2 | 1/2013 | Luckett | |
| 8,485,317 B2 | 7/2013 | Gerstenkorn et al. | |
| 8,607,936 B2 | 12/2013 | Szentisvany et al. | |
| 8,660,565 B2 | 2/2014 | Hall | |
| 9,016,437 B2 | 4/2015 | DiGiovanni et al. | |
| 9,338,617 B2 | 5/2016 | Douglas et al. | |
| 9,457,992 B2 | 10/2016 | Ooms | |
| 9,751,724 B2 | 9/2017 | Doms | |
| 9,751,725 B2 | 9/2017 | Hall et al. | |
| 9,850,093 B2 | 12/2017 | DePaola et al. | |
| 9,908,745 B2 | 3/2018 | De Droon et al. | |
| 10,011,462 B2 | 7/2018 | Ooms et al. | |
| 10,118,797 B2 | 11/2018 | Keser | |
| 10,224,768 B2 | 3/2019 | Zanotti | |
| 10,625,981 B2 | 4/2020 | Rosenthal | |
| 11,560,290 B2 | 1/2023 | Lodi | |
| 2002/0011383 A1 | 1/2002 | Grass | |
| 2004/0104078 A1 | 6/2004 | Szentistvany et al. | |
| 2004/0255709 A1 | 12/2004 | Reitberger | |
| 2005/0177288 A1 | 4/2005 | Sullivan et al. | |
| 2008/0271953 A1 | 11/2008 | Vroegindeweij | |
| 2010/0064835 A1 | 3/2010 | Luckett | |
| 2010/0101894 A1 | 4/2010 | Szentistvany et al. | |
| 2011/0024237 A1 | 2/2011 | Vroegindeweij | |
| 2011/0278096 A1 | 11/2011 | Kentenich et al. | |
| 2012/0048652 A1 | 3/2012 | DiGiovanni et al. | |
| 2014/0083801 A1 | 3/2014 | Vroegindeweij et al. | |
| 2015/0375965 A1 | 12/2015 | Awerbuch et al. | |
| 2016/0236906 A1 | 8/2016 | Horton | |
| 2016/0268805 A1 | 9/2016 | Finn et al. | |
| 2017/0001837 A1 | 1/2017 | Hall et al. | |
| 2017/0144860 A1 | 5/2017 | Colenutt | |
| 2017/0158464 A1 | 6/2017 | Kroon et al. | |
| 2017/0233223 A1 | 8/2017 | Hoedjes | |
| 2017/0247227 A1 | 8/2017 | Rosenthal | |
| 2019/0047825 A1 | 2/2019 | Jakes et al. | |
| 2020/0239282 A1 | 7/2020 | Lodi | |

FOREIGN PATENT DOCUMENTS

| | | | | |
|---|---|---|---|---|
| EP | 2377795 A1 | 10/2011 | | |
| EP | 3215450 B1 | 11/2015 | | |
| EP | 3202699 A1 * | 8/2017 | .......... | B66B 9/0838 |
| GB | 2367807 A | 4/2002 | | |
| GB | 2542883 A * | 4/2017 | ............ | B66B 1/302 |
| GB | 2551817 A | 1/2018 | | |
| JP | 2012184062 A | 9/2012 | | |
| KR | 2001-0055394 A | 7/2001 | | |
| WO | 2000/23371 A1 | 4/2000 | | |
| WO | WO-2013137730 A1 * | 9/2013 | ............... | B66B 9/08 |
| WO | 2018/002573 A1 | 1/2016 | | |
| WO | 2016/072849 A1 | 5/2016 | | |

OTHER PUBLICATIONS

English machine translation of CN 108787799.
Supplementary European Search Report for EP Application No. EP20815219 dated Jul. 24, 2023, 07 pages.
International Search Report from International Patent Application No. PCT/US2020/035448 mailed Oct. 20, 2020, 3 pages.

* cited by examiner

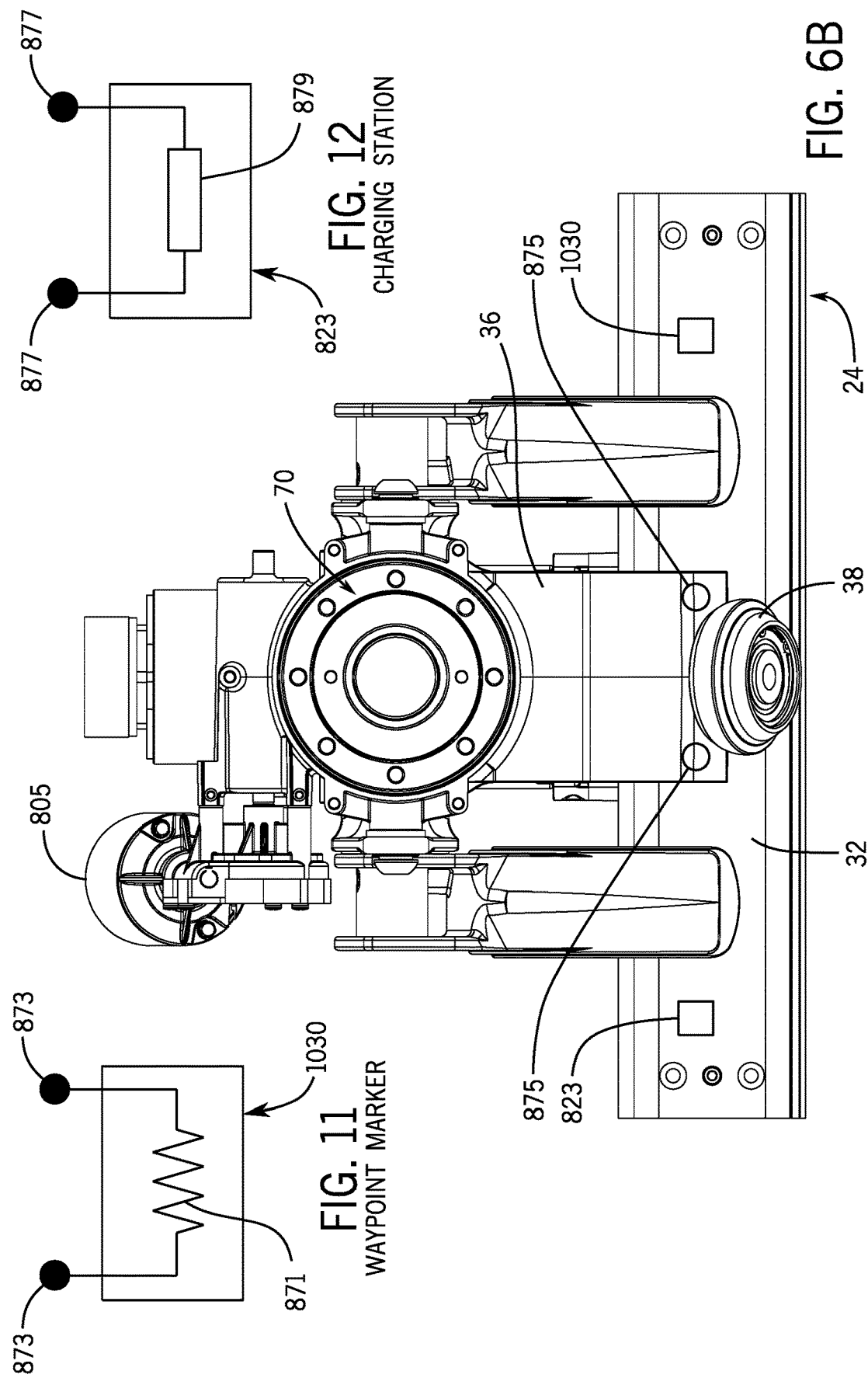

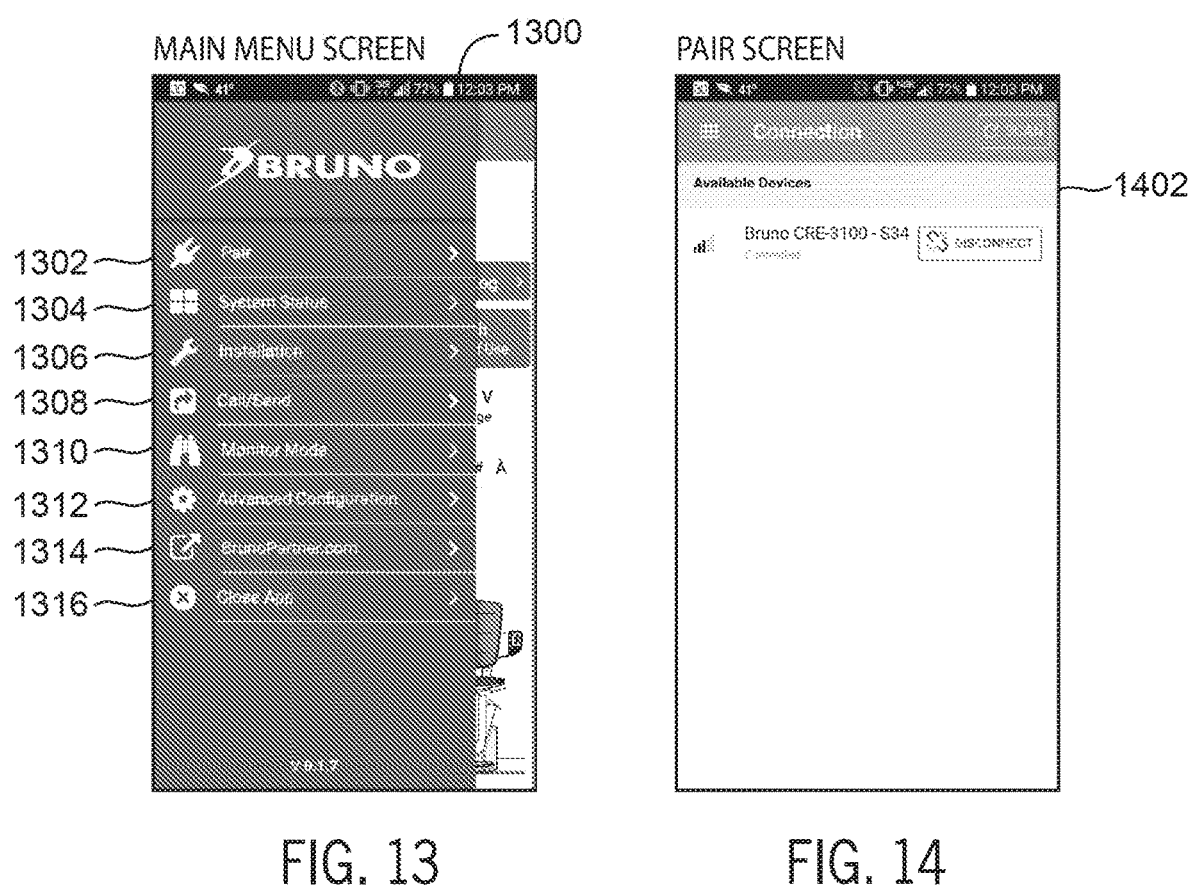

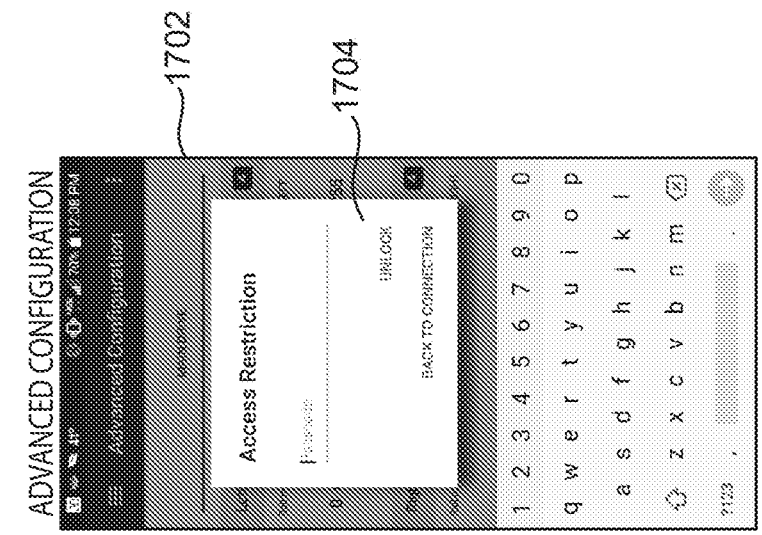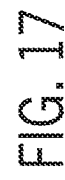
FIG. 17
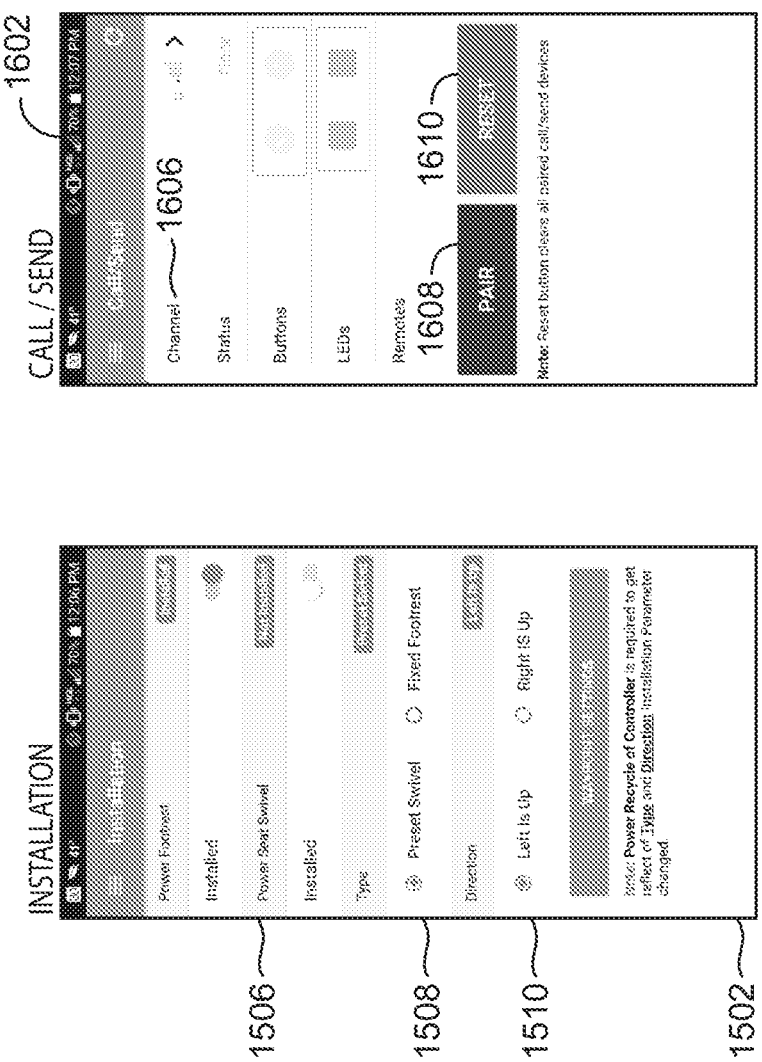
FIG. 16
FIG. 15

MULTI-FUNCTION STAIRLIFT CONNECTIVITY SYSTEM

RELATED APPLICATIONS

This application claims the domestic benefit of U.S. Provisional Application Ser. No. 62/855,059 filed on May 31, 2019 and U.S. Provisional Application Ser. No. 62/886,546 filed on Aug. 14, 2019, the contents of which are incorporated herein in their entirety.

FIELD OF THE DISCLOSURE

The disclosure relates to a multi-function stairlift connectivity system for diagnosing issues in a stairlift, which is capable of conveying a load along a rail situated on a stairway or other path.

BACKGROUND

Stairlifts systems, also referred to as chair lifts, stairway elevators, and other similar names, transport people and/or cargo up and down inclined paths such as stairways. Stairlifts include a rail and a carriage carried by the rail and movable along the rail.

A carriage includes a frame, which may include rollers that ride on the rail, a load support attached to the frame and supporting a load, such as a chair or wheelchair platform, and a carriage drive attached to the frame to drive the frame and load support along the rail. The carriage drive may include a motor and a rack and pinion, screws, chains, cables, belts, and the like driven by the motor to cause the carriage and its associated load support to move along the rail. The load support is rotatably connected to the frame by a rotation device, such that the load support rotates about a horizontal axis relative to the carriage.

A control unit controls the rotation device, such that the load support is positioned in a desired orientation relative to a horizontal plane. The rotation device includes a motor and a rotator, where the motor is operatively connected to the load support via the rotator to cause rotation of the load support relative to the carriage about the horizontal axis.

The rail is mounted adjacent to or on the stairs, and the carriage is attached to the rail. A person seated on the load support may be moved up or down the stairway along the rail. The rails may be straight or curved.

SUMMARY

A stairlift includes a rail, a carriage configured to move along the rail, where the carriage includes a main drive motor configured to engage the rail to move the carriage along the rail, and where a main drive controller controls operation of the main drive motor. A plurality of sensors and switches provide data to the main drive controller. A plurality of waypoint markers are fixed to the rail at predetermined positions along the rail, and a waypoint reader operatively coupled to the main drive controller is configured to determine a position of the carriage along the rail by identifying each of the plurality of waypoint markers such that no encoders are required to establish a position of the carriage along the rail. Each waypoint marker may include a resistive element configured to be detected by a waypoint reader fixed to the carriage, where the resistive value of each of the plurality of waypoint markers is preferably different from all of the other waypoint markers.

One aspect of the invention is a system for controlling a drive of a carriage of a stairlift comprising the carriage and a rail engageable with the drive for guiding the carriage, wherein the system comprises:

(a) a plurality of waypoint markers, wherein each waypoint marker is a device affixed to the rail having a detectable electromagnetic characteristic;

(b) a detector mounted on the carriage, wherein the detector is capable of detecting the detectable electromagnetic characteristic of each waypoint marker; and (c) a controller capable of controlling the drive, wherein the controller is capable of detecting the detectable electromagnetic characteristic of each waypoint marker via the detector, wherein each waypoint marker has a detectable electromagnetic characteristic which is detectably different from the electromagnetic characteristic of the other waypoint markers and the controller is capable of associating the detectable electromagnetic characteristic of each waypoint marker with a control function to be carried out by the controller.

Another aspect of the invention is a system for controlling a drive of a carriage of a stairlift comprising the carriage and a rail engageable with the drive for guiding the carriage, wherein the system comprises:

(d) a plurality of waypoint markers, wherein each waypoint marker is a device capable of being affixed to a rail of a stairlift having an electromagnetic characteristic;

(e) a detector mounted on, or mountable on, a carriage of a stairlift, wherein the detector is capable of detecting the electromagnetic characteristic of each waypoint marker; and (f) a controller capable of controlling the drive, wherein the controller is capable of detecting the electromagnetic characteristic of each waypoint marker via the detector, wherein each waypoint marker has an electromagnetic characteristic which is detectably different from the electromagnetic characteristics of the other waypoint markers and the controller is capable of associating the electromagnetic characteristic of each waypoint marker with a control function to be carried out by the controller.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 6B is a side view of the drive mechanism of the stairlift of FIG. 5;

FIG. 11 shows a waypoint component or marker, according to one embodiment;

FIG. 12 shows a charging component that interacts with the waypoint maker of FIG. 11, according to one embodiment; and FIGS. 13-32 show various menus or screens that may be presented to the installer or technician, which are displayed on a remote communication device operatively coupled to the stairlift.

DETAILED DESCRIPTION

Figure 1:
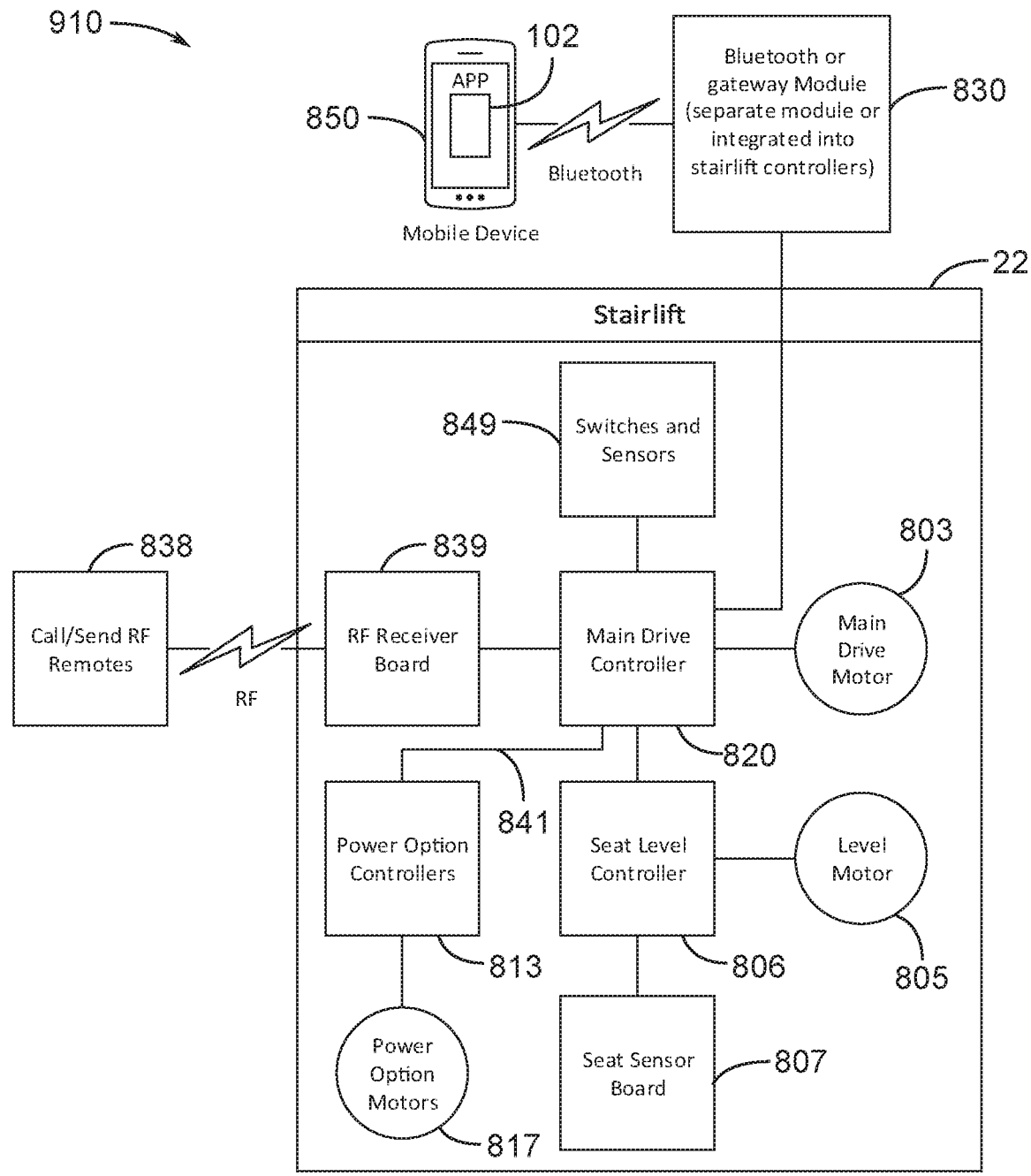
FIG. 1 is a high-level block diagram of a multi-function stairlift connectivity system according to one embodiment.

While the disclosure may be susceptible to embodiment in different forms, there is shown in the drawings, and herein will be described in detail, a specific embodiment with the understanding that the present disclosure is to be considered an exemplification of the principles of the disclosure, and is not intended to limit the disclosure to that as illustrated and described herein. Therefore, unless otherwise noted, features disclosed herein may be combined together to form additional combinations that were not otherwise shown for purposes of brevity. It will be further appreciated that in some embodiments, one or more elements illustrated by way of example in a drawing(s) may be eliminated and/or substituted with alternative elements within the scope of the disclosure.

Definitions

The expression "waypoint marker" as used herein means a device having an electromagnetic characteristic which is capable of being detected by a detector solely when the detector is in close proximity to, or in contact with, the waypoint marker and which is capable of being affixed to a rail of a stairlift. The waypoint marker is preferably capable of being affixed at an arbitrary location on the rail of a stairlift that may be chosen by a technician while installing the stairlift. The waypoint marker is preferably capable of being removably affixed to a rail of stairlift to allow for changes to the position of the waypoint marker when modifying the rails or optimizing the functioning of the stairlift.

The expression "electromagnetic characteristic" as used herein means an intrinsic electromagnetic property of a physical device capable of being detected by a detector solely when the detector is in proximity to, or in contact with, the physical device having the intrinsic electromagnetic property. In a preferred embodiment of this invention, the intrinsic electromagnetic property is resistance to an electric current applied by a detector to the physical device comprised in a waypoint marker.

The term "detector" as used herein means a device that is capable of transmitting an electrical current or signal corresponding to the electromagnetic characteristic of a specific waypoint marker to a controller when the waypoint marker is in proximity to, or in contact with, the detector. The detector is preferably electrically connected to a controller for transmitting an electric current, or an electric signal, between the detector and the controller. In a preferred embodiment, the detector is at least one electric conductor capable of making contact with the waypoint marker for conducting electric current through the waypoint marker.

The term "controller" as used herein means a device that is capable associating an electric current or signal from a detector with a function of a carriage of a stairlift. The controller is preferably a programmed, or programmable, device capable of associating a specific operation of the carriage with a specific electric current or signal from a detector associated with a specific waypoint marker. In a preferred embodiment, the controller controls the main drive motor of the carriage. The controller is preferably capable of controlling the speed of the carriage, parking the carriage for charging, and/or adjusting the swivel position of a chair mounted on the carriage.

FIGS. 1-6 illustrate a multi-function stairlift connectivity system 20, 120 provided for performing diagnostic tests and installation of a stairlift 22 by a technician. The stairlift 22, also referred to as a chair lift, stairway elevator, rail elevator, and other similar names, typically includes a rail 24 mounted along a stairway 26 or other inclined path on which a carriage 28 operates to move a load 30. The stairlift 22 provides smooth transitions through turns, curves, bends and other changes in the rail 24. The multi-function stairlift connectivity system 20, 120 enables a technician to wirelessly connect to and interact with the stairlift 22 to perform various functions in connection with the stairlift 22, for example, installation, configuration, maintenance, diagnosis, repair, troubleshooting and other functions.

Figure 3:
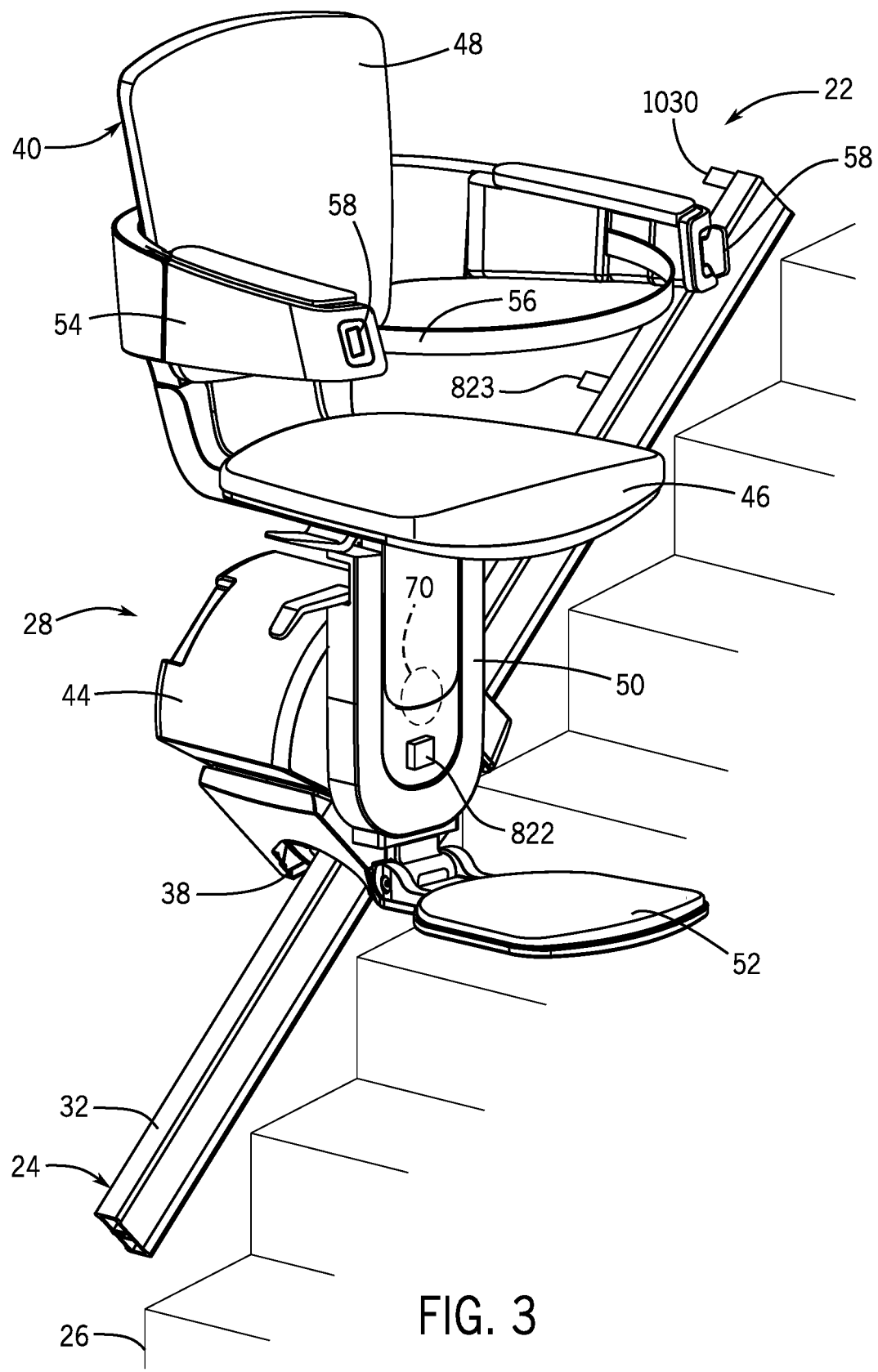
FIG. 3 is a perspective pictorial diagram of the stairlift and chair according to one embodiment.
Figure 4:
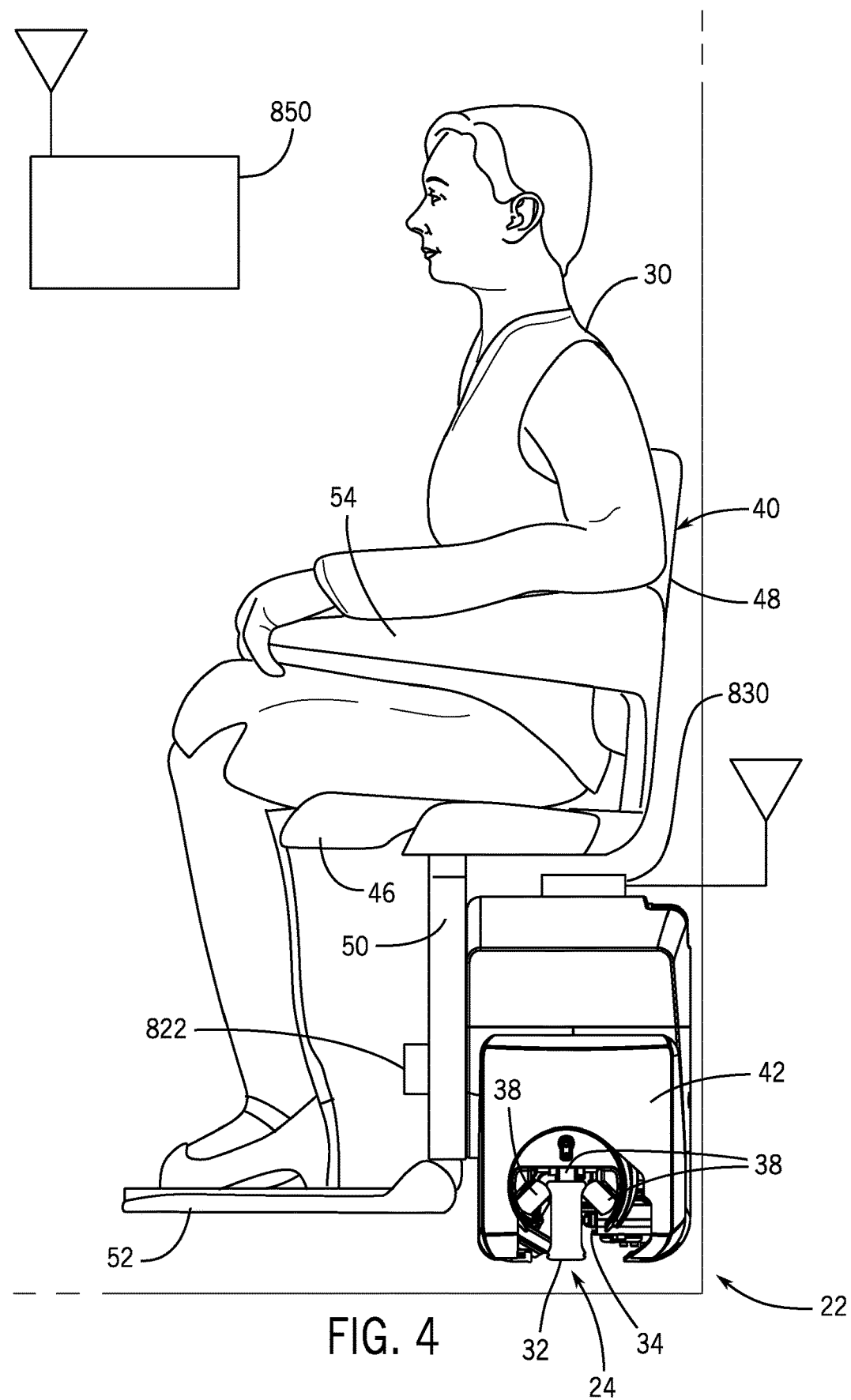
FIG. 4 is a side view pictorial diagram of the stairlift and chair according to the embodiment of FIG. 3.

As shown best in FIGS. 3 and 4, the rail 24 includes a tube or hollow track 32 having a toothed rack 34 carried on or affixed to the tube 32. The tube 32 is shown as having a generally rectangular cross-section, however, the tube 32 can have other cross-sections, such as, for example, a circular cross-section. The rail 24 may include inclines, declines, various types of curves (including helical twists, turns and vertical elevation angle changes) and/or other changes in direction and/or orientation. Thus, various curves (helical, vertical, horizontal and combinations thereof) must be negotiated by the carriage 28. An angle change transitions the carriage 28 elevationally from one incline/decline angle to another.

There are two types of angular changes along the rail 24, namely, "going in" angle changes and "going out" angle changes. A "going in" angle change is an angle change that starts from a steeper angle and transitions to a flatter incline. A "going out" angle change is an angle change that starts from a lower degree and transitions to a higher degree incline. "Turns" transition the carriage 28 around a corner (horizontal bend) in a plan view.

There are two primary types of turns and each primary type of turn has a corresponding secondary set. During an "inside turn" a rider's feet swing widely while the rider's back is closer to the turn's pivot point. In general, the rail 24 may be installed as close as possible to a wall to which the rail 24 is mounted to allow for maximum clearance for ambulatory people in the staircase. Inside turns often rotate the rider 90° or 180° in the plan view. A "helical turn" introduces an incline or elevation change while turning corners in connection with inside and outside turns (similar to a corkscrew or coil spring).

A gooseneck or drop-nose configuration can also be provided which has a going in angle change, with an extremely steep start angle (e.g., vertical) that transitions to the incline of the stairway 26. The gooseneck or drop-nose configuration provides a relatively low height position of the load 30 relative to a floor at a base of the stairway 26, and a short extension away from a first step riser of the stairway 26.

As shown in FIGS. 3-6A, the carriage 28 includes a frame 36 (FIGS. 5 and 6A) which may include rotatable rollers 38 mounted thereon and which ride on the rail 24, a load support 40 attached to the frame 36 and supporting the load 30, and a carriage drive 42 attached to the frame 36 to drive the carriage 28 along the rail 24. The load 30 may be, for example, an individual rider and/or cargo. The frame 36, with the exception of where the rollers 38 contact the rail 24, and the carriage drive 42, may be covered by a shroud 44.

In one embodiment as shown in the drawings, the load support 40 or occupant chair includes a seat 46, a backrest 48 extending from the seat 46, a chair plate 50 extending downwardly from the seat 46, a footrest 52 extending from the bottom of the chair plate 50, foldable armrests 54, and a safety belt 56 attached to the armrests 54. Control buttons 58, may be provided on one of the armrests 54 to allow a rider to operate the stairlift 22 when seated on the load support 40. The control buttons 58 are in communication with a main drive controller 820.

In the embodiment shown in the drawings, the carriage drive 42 includes a main motor 803 mounted to the frame 36, which drives a toothed gear 62 that engages the toothed rack 34. The main motor 803 is controlled by the main drive controller 820. When the carriage drive 42 is engaged under operation by the main drive controller 820, the toothed gear 62 is driven, which causes the carriage 28 to travel along the rail 24 by the engagement of the toothed gear 62 and the toothed rack 34.

Figure 5:
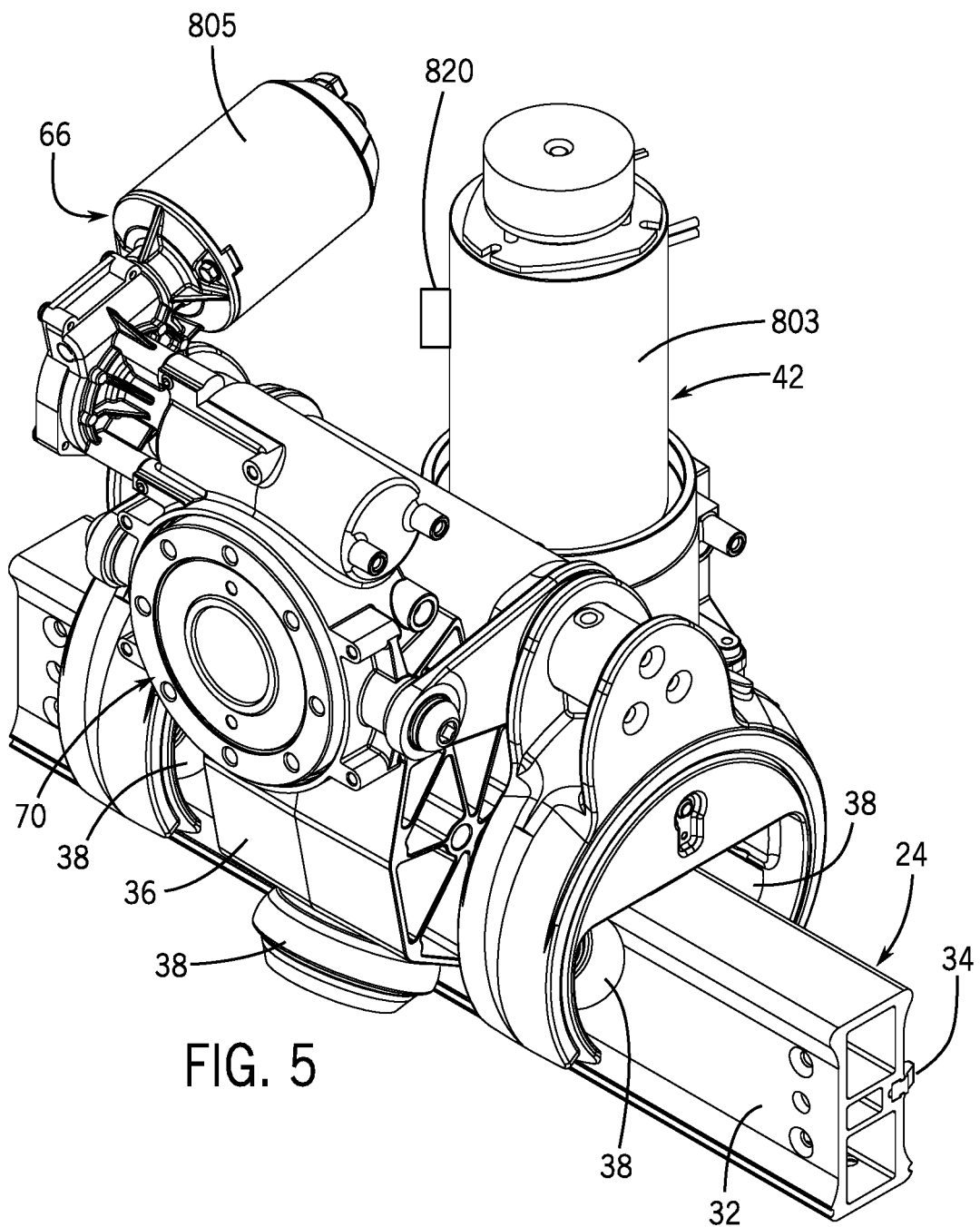
FIG. 5 is a perspective view of a drive mechanism of the stairlift according to one embodiment.
Figure 6A:
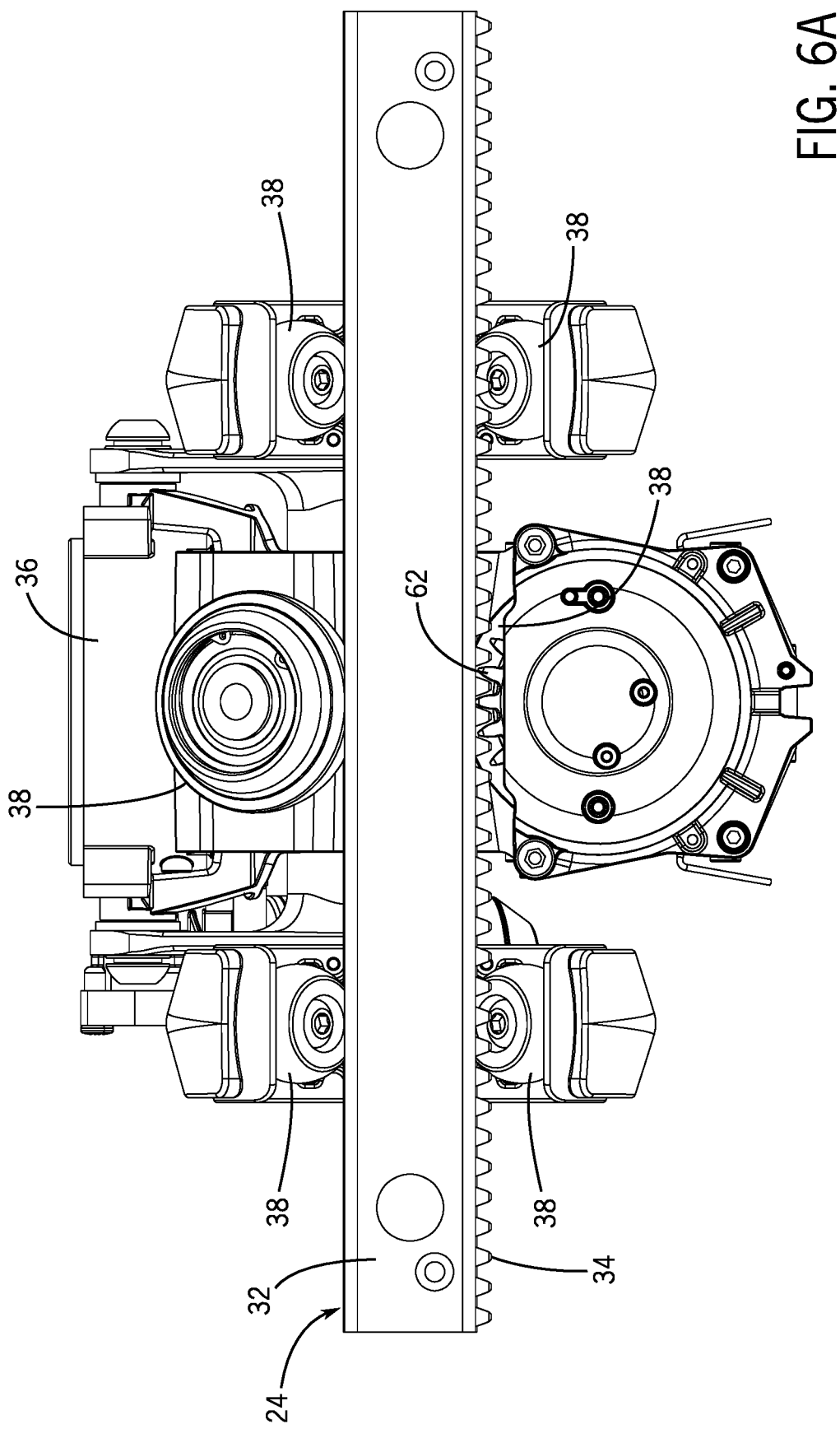
FIG. 6A is a bottom view of the drive mechanism of the stairlift of FIG. 5.

As shown in FIG. 5, the load support 40 is rotatably connected to the frame 36 by a rotation device 66. The rotation device 66 rotates the load support 40 about a horizontal axis relative to the frame 36 to maintain the load 30 in an upright position as the carriage 28 traverses along the rail 24. The rotation device 66 includes a leveling motor 805 and a rotator 70 mounted on the frame 36, where the leveling motor 805 is operatively connected to the load support 40 via the rotator 70. The leveling motor 805 can be covered by the shroud 44. In one embodiment, the rotator 70 is attached to the chair plate 50.

A load level controller 806 controls the rotation device 66 and the leveling motor 805, such that the load support 40 is positioned in a desired orientation relative to a horizontal plane. As an example, the rotation device 66 rotates the load support 40 such that the seat 46 is maintained in the horizontal plane.

Figure 8:
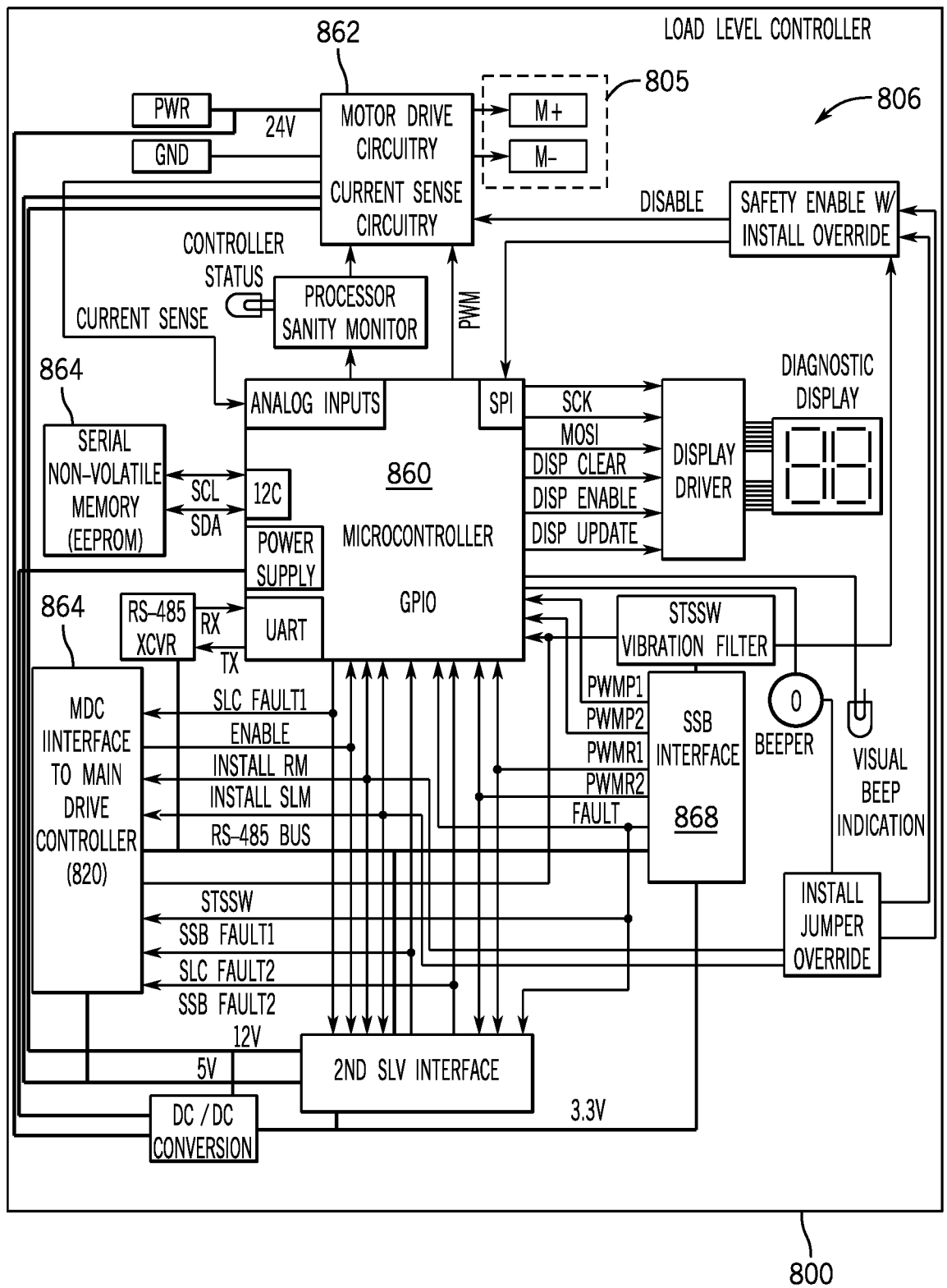
FIG. 8 is an electrical block diagram of the load level controller according to one embodiment.
Figure 9:
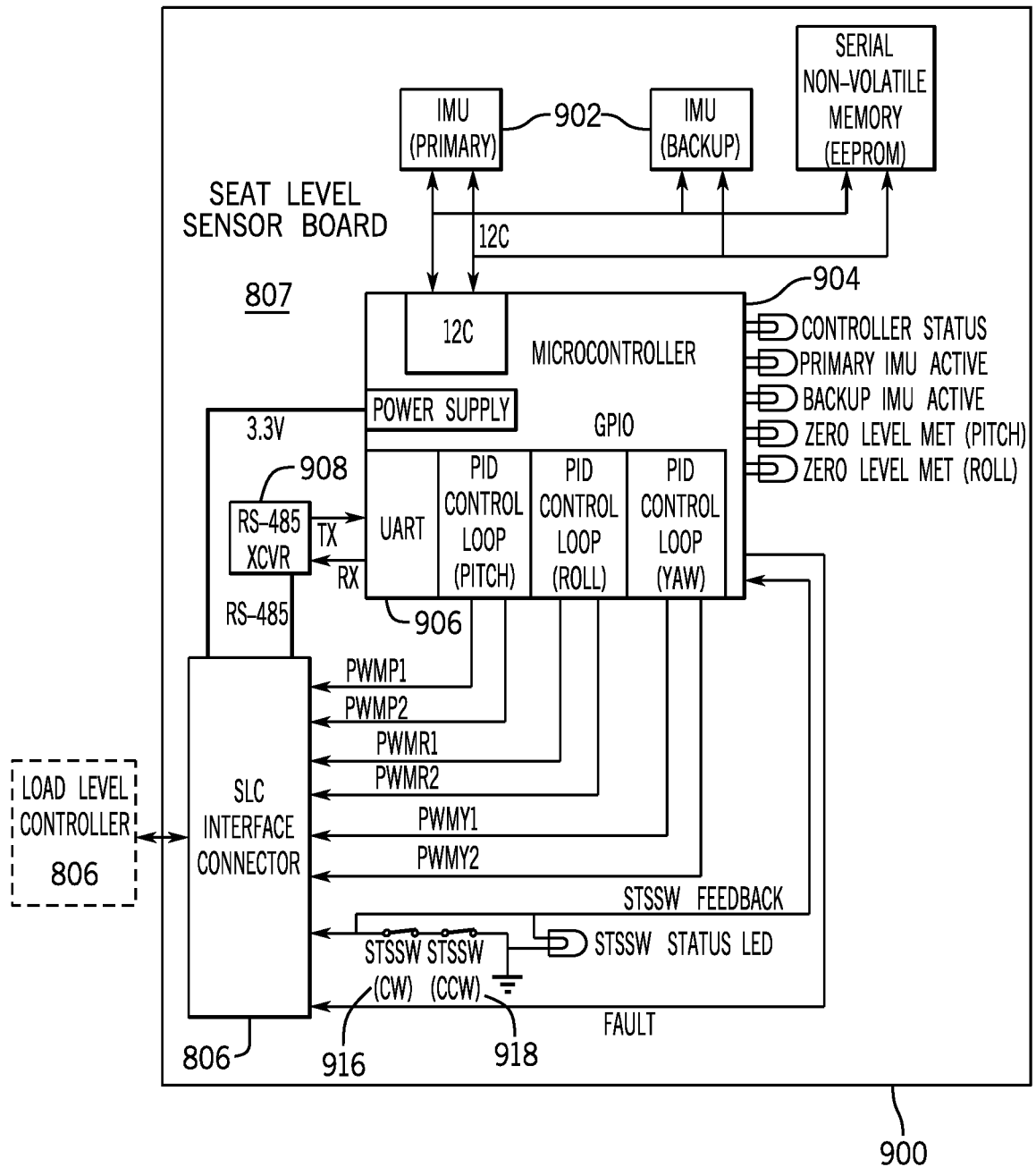
FIG. 9 is an electrical block diagram of the seat level sensor board according to one embodiment.

FIG. 7 shows an electrical block diagram 700 of the main drive controller 820. FIG. 8 shows an electrical block diagram 800 of the load level controller 806. FIG. 9 shows an electrical block diagram 900 of a seat level sensor board 807. The seat level sensor board 807 provides input to the load level controller 806 so as to maintain the chair in a horizontal position as the stairlift 22 navigates along the various inclines and declines of the rail 24. The main drive controller 820, the load level controller 806, and the seat level sensor board 807 are interconnected as shown in the pictorial interconnection diagram of FIGS. 10A-B.

Figure 7A:
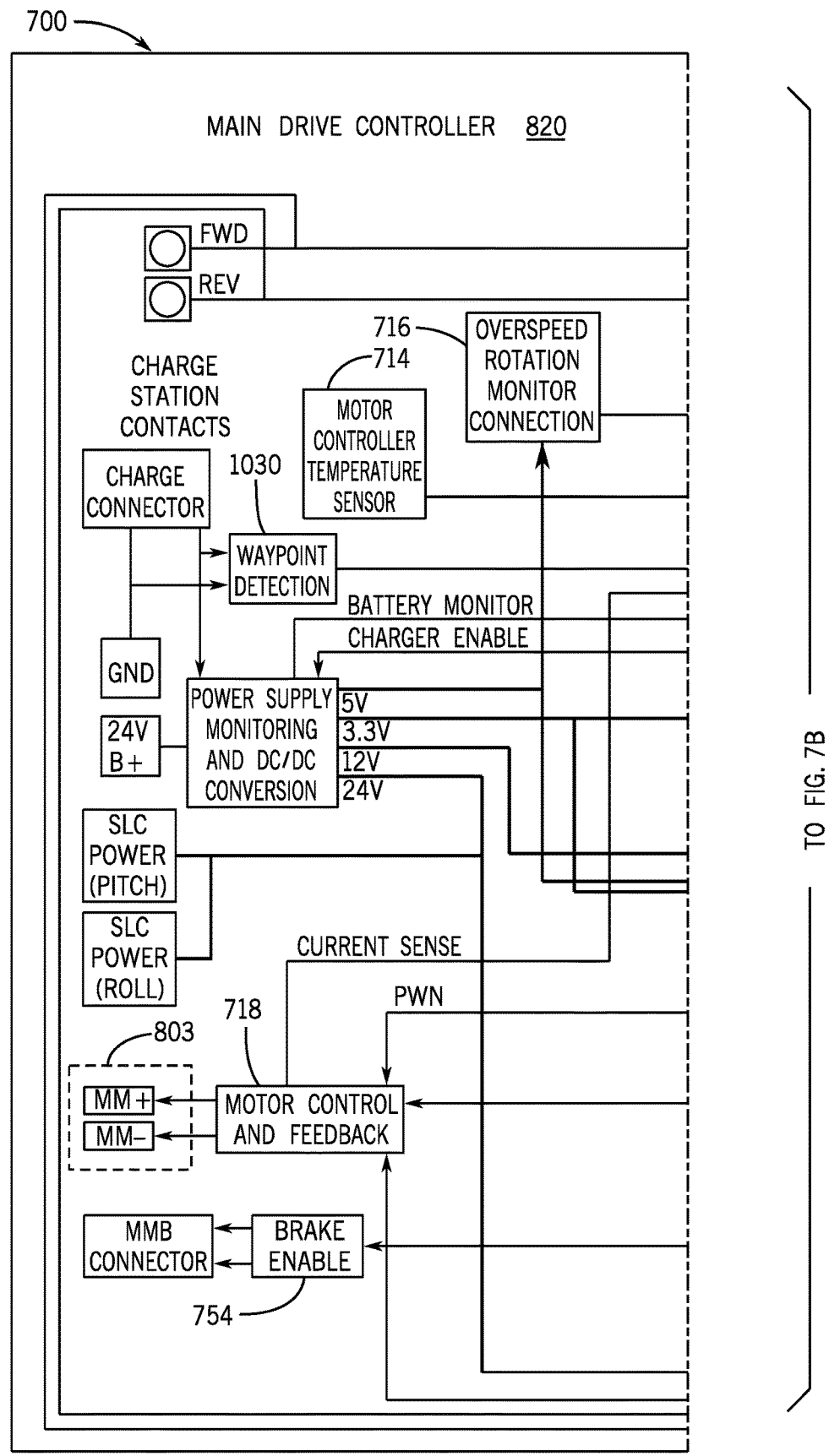
FIG. 7A-7C is an electrical block diagram of the main drive controller according to one embodiment.
Figure 7B:
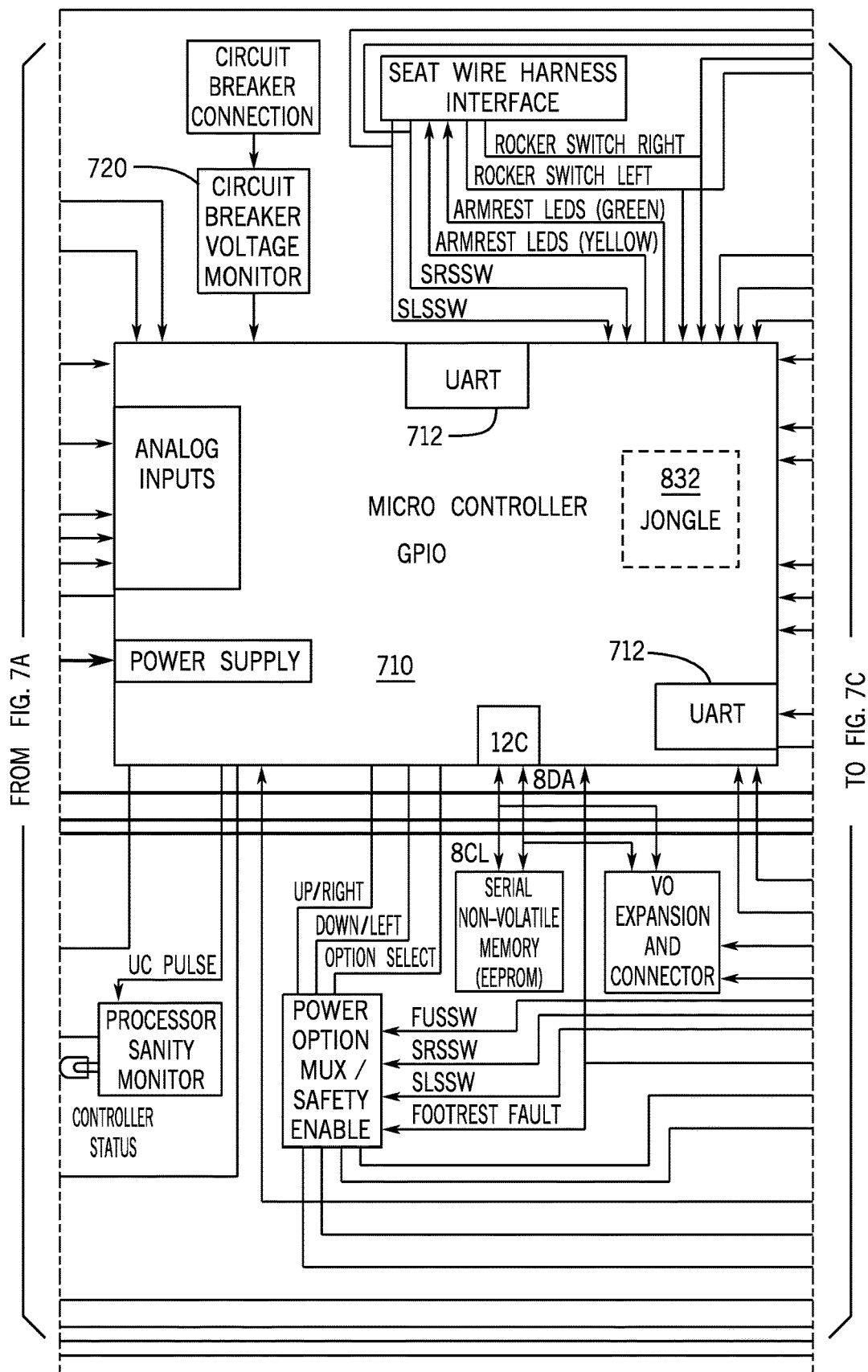
Figure 7C:
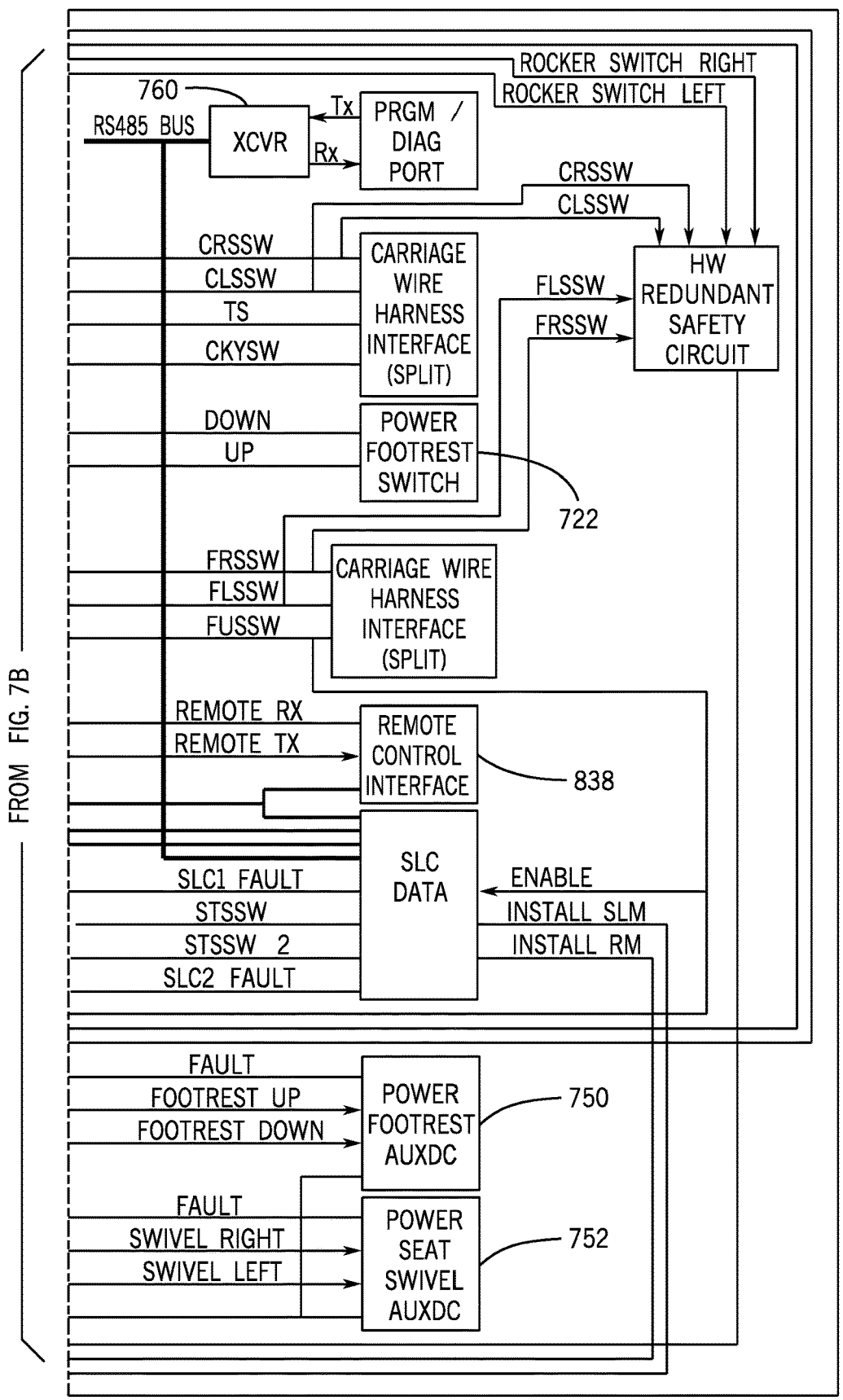

The main drive controller 820 of FIG. 7A-C includes a microcontroller 710, which further includes one or more universal asynchronous receiver-transmitter devices (UARTs) 712 to permit various communications. The main drive controller 820 may receive input from the waypoint markers 1030, motor control temperature sensors 714, overspeed rotation sensor 716, motor control feedback sensing component 718, voltage monitoring sensors 720, power foot rest switches 722, and footrest sensor 822. The motor control feedback sensing component 718 may sense motor current draw as well as control a pulse-width modulated signal indicating a motor shaft rotation speed. The pulse-width modulated signal may be modified to control the speed of the main drive motor 803.

In response to the various inputs, the main drive controller 820 may provide a plurality of outputs, such as power foot rest control 750, power seat swivel control 752, brake enable 754, and main motor control/feedback signals 718 to the main motor 803.

Figure 10A:
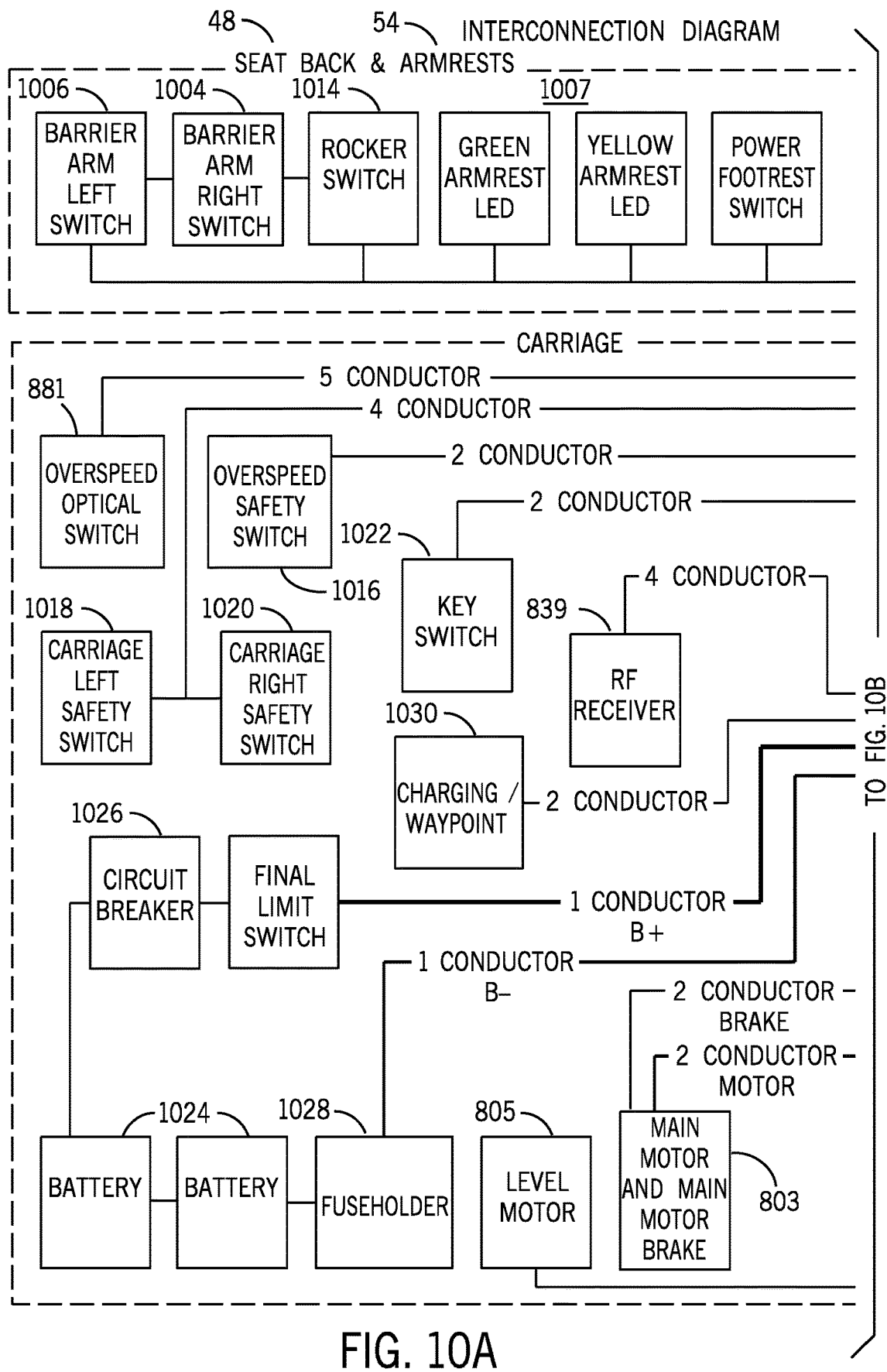
FIGS. 10A and 10B are a pictorial interconnection diagram showing connection between the main drive controller, the load level controller, seat level sensor board, sensor input components, and drive output components, according to one embodiment.
Figure 10B:
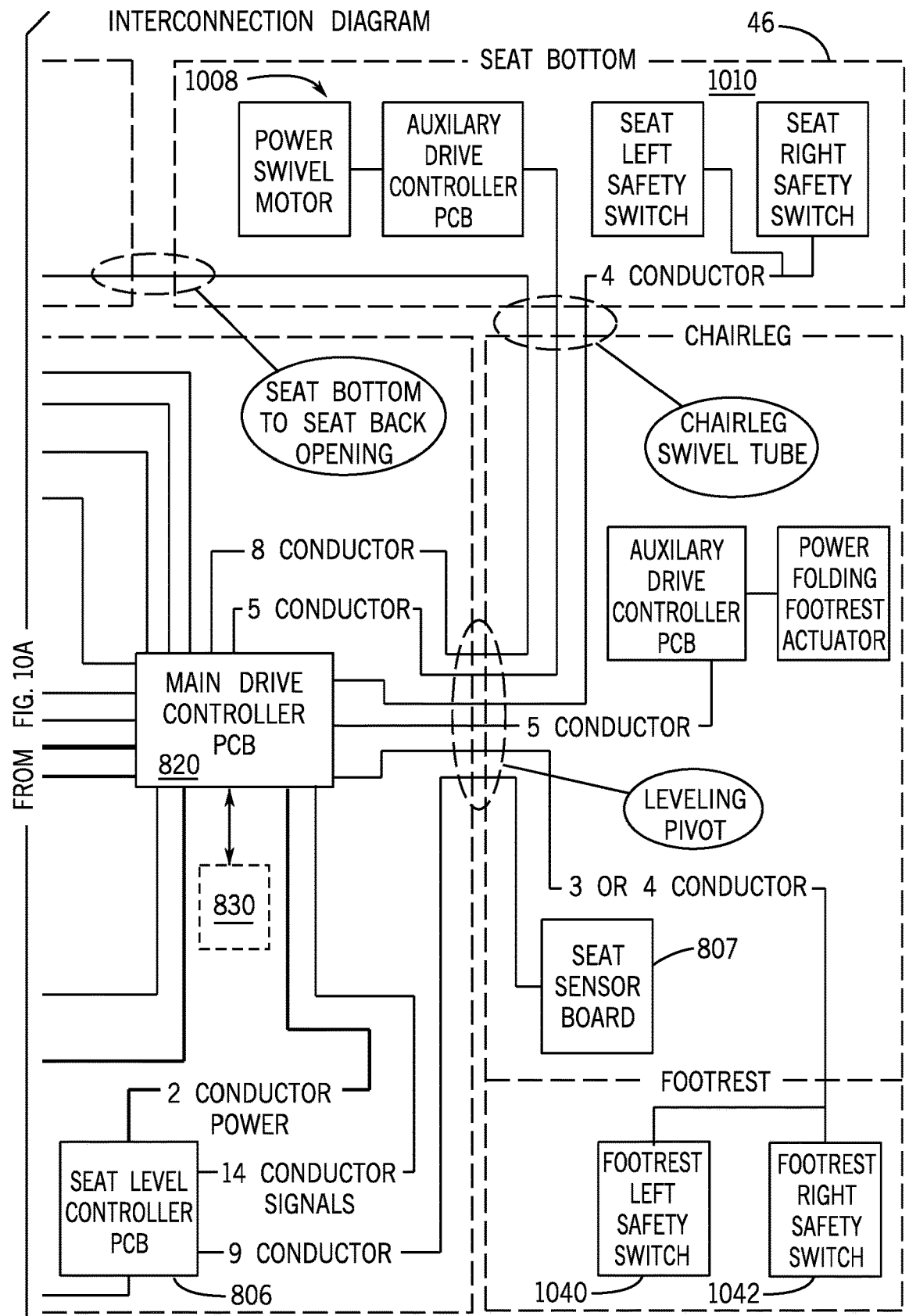

As shown in FIGS. 10A-B other various input switches, including for example, a left barrier arm switch 1006, a right barrier arm switch 1004, up/down rocker or paddle switches 1014, and other various output indicators 1007 associated with the backrest 48 and armrests 54, are shown, along with the power swivel motor 1008 and safety switches 1010 associated with the seat bottom 46, all of which are under control of the main drive controller 820.

Additional inputs may be provided to the main drive controller 820, including an overspeed optical sensor 881, overspeed safety switch 1016, left and right carriage safety switches 1018, 1020, key switch 1022, left side footrest safety switch 1040, and right side footrest safety switch 1042. Power electrical components, such as batteries 1024, circuit breakers 1026, fuse holders 1028, and waypoint markers 1030, waypoint charging station 823 for charging the battery, are also operatively coupled to the main drive controller 820.

Note that the overspeed optical sensor 881 may be used to monitor the speed of the main drive motor 803, and is based on physical/mechanical contact between the rail 24 and a wheel or roller. This required by safety code in most jurisdictions.

An RF receiver board 839 may be coupled to the main drive controller 820 to provide connectivity for a two-button hand-held remote call unit 838 (FIGS. 1 and 2), which may be used to "call" the carriage 28 to move to the top position of the stairlift 22, the bottom position of the stairlift 22, or any suitable mid park call position depending on the application.

FIG. 11 shows an electrical schematic diagram of the waypoint contact 1030, while FIG. 12 shows a component view of charging station 823 used to connect to the battery 1024 for charging purposes. The waypoint marker 1030 may provide location information of the carriage 28 along the rail 24, and/or may further provide electrical charging station 823 to permit the main battery 1024 to be charged when positioned at a selected location along the rail 24, typically at the top of the rail 24, the bottom of the rail 24, or a suitable flat landing.

Various waypoint markers 1030 may be positioned along the rail 24, typically by the technician during installation of the stairlift 22 in the facility. The waypoint markers 1030 may include resistive elements that permit a waypoint reader to identify the particular waypoint marker. The waypoint reader may include contacts or a brush mechanism 875 (FIG. 6B), which is operatively attached to the frame 36 or the carriage 28 and slides along the rail 24 as the carriage 28 moves. When the contacts or brush mechanism 875 contacts the waypoint marker 1030, a change in resistance is observed by the main drive controller 820, and thus the position of the carriage 28 may be determined based on the resistance of the particular waypoint marker 1030.

Preferably, each waypoint marker 1030 has a unique resistive value, within a predetermined range. When the contacts or brush mechanism 875 contacts a particular waypoint marker 1030, its resistance is measured, and based on the resistance measured, the position of the carriage 28 associated with a particular waypoint position along the rail 24 can be determined.

Note that known staircase/elevator systems typically include encoders, whether optical encoders, magnetic encoders, or mechanical encoders, or similar encoder technology, to track the exact position of the carriage 28 as it moves along the entire length of the rail 24. Some known staircase/elevator systems use mechanical encoding that tracks teeth, tape, or markings along the rail 24. Still other staircase/elevator systems use pulse count information obtained from a rotating wheel in contact with the rail 24, while other known systems track motor shaft rotation, for example, by using a Hall-effect device proximal to a magnet on the motor shaft. These encoding components add expense and complexity to known systems, and further complicates the software associated with the known systems because various distances along the encoder track must be accounted for in the programming of the system, which usually must be handled at the point of manufacture when the rails are custom bent and shaped. This is necessary because the system must "know" about the different angles, bends, inclines, and declines in the custom rail configuration so that different motion operations can be performed at selected positions along the rails due to that specific rail configuration, all of which is governed by the known position provided by the encoder.

Such motion operations may include decreasing speed, stopping for a predetermined amount of time, increasing speed, swiveling, adjusting the level of the seat based on the incline angle, and the like. In known systems, this must be programmed into the memory of the system at time of manufacture so as to reflect the exact custom rail configuration. Additionally, registration, calibration, or "zeroing out" of the encoder must be performed in such known systems. Because these tasks are performed by the technician, further opportunity for error is created.

It is advantageous that embodiments of the stairlift 22 do not use any such encoders or encoder techniques described above to determine or assist in determining the position of the carriage 28. Rather, the position of the carriage 28 and the associated motion operations to be performed are all governed by the plurality of waypoint markers 1030.

In that regard, in a preferred embodiment, eight waypoint markers 1030 may be installed along the rail 24. However, a greater number of waypoint markers 1030 or a fewer number of waypoint markers 1030 may be installed depending on the size and scope of the installation. At each waypoint marker location, a particular operation may be performed, such as decreasing speed and parking for charging, adjusting swivel position of the chair, and performance of overall speed control.

As shown in FIGS. 6B, 11 and 12, the waypoint marker 1030 on the rail 24 may be defined by physically positioning or affixing the waypoint marker 1030 on the rail 24 using suitable fastening method. Waypoint markers 1030 can provide detectable electromagnetic characteristics (for example, in a detection element) when the carriage 28 passes the waypoint marker 1030, thus enabling rail location determinations of the carriage 28 as the carriage 28 moves along the rail 24. In a preferred embodiment, the carriage 28 utilized the contacts or brush mechanism 875 described above to make electrical contact with the resistive portion of the waypoint marker 1030. However, other methods may be used, such as an electromagnetic detector, magnetic detector and the like, of course using different waypoint provisioning.

In a preferred embodiment shown in FIG. 11, the waypoint marker 1030 may include a resistive element 871 connected to a pair of electrical contacts 873. The electrical contacts 873 come into contact with charging contacts which may be part of the contacts or brush mechanism 875 (FIG. 6B) of the carriage 28, and thus the main drive controller 820 can determine the identity of the waypoint marker 1030 by measuring the resistive value provided by that particular waypoint marker 1030.

As shown in FIGS. 3, 6B and 12, one or more charging stations 823 having electrical charging contacts 877, may be situated along a rail 24 (for example, at a top terminus of the rail 24, a bottom terminus of the rail 24 and/or at one or more intermediate landing locations on the rail 24) and may be identified in an appropriate manner so that both waypoints and charging station data can be generated, collected and made available to the main drive controller 820.

Each charging station 823 may provide the electrical charging contacts 877 that engage the contacts or brush mechanism 875 of the carriage 28, thus connecting the carriage 28 to a source of power supply 879 for charging the battery 1024. After the carriage 28 stops at or passes through a waypoint marker 1030, the main drive controller 820 can store the identification of the last waypoint marker 1030, as well as other waypoint-related data, and provide such data to the main drive controller 820, and/or to a technician accessing the stairlift 22.

Turning now to FIG. 8 through FIG. 10A-B, the load level controller 806 is shown in detail in FIG. 8, and may include a microcontroller 860, motor drive circuitry 862 to drive the leveling motor 805, memory 864, and an MDC interface 866 to the main drive controller 820. The load level controller 806 receives input from the seat level sensor board 807 via the SLC interface connector 868, which couples to the corresponding SLC interface connector 912 of the seat level sensor board 807. Connection between the load level controller 806, the seat level sensor board 807, and the main drive controller 820 is best shown in FIGS. 10A-B.

As shown in FIG. 9, the seat level sensor board 807 is preferably mounted on the load carrier or chair and includes one or more inertial measurement units 902 (IMU), a microcontroller 904, universal asynchronous receiver-transmitter devices (UART) 906, and RS-485 receiver 908. The seat level sensor board 807 is operatively coupled to the load level controller 806 via a seat level controller (SLC) interface connector 912. Two safety switches, namely a clockwise maximum level switch (STSSW) 916 and a counter-clockwise maximum level switch (STSSW) 918 provide a fault indication should the seat deviate by more than a predetermined amount from horizontal, for example by more than five degrees from horizontal. Trigging of either of these two safety switches 916, 918 results in immediate stopping of the main drive motor 803.

The seat level sensor board 807 is configured to sense the roll, pitch and yaw angles of the load support 40 and seat 46 in some embodiments, for example using the inertial measurement unit 902. Again, this avoids the need for encoders along the rail 24 that map a rail configuration to control the ride parameters, such as those used in known staircase/elevator systems.

As described above, embodiments described herein do not depend on encoded position information. Rather, an absolute seat level value is determined in real time as provided by sensing components on the seat level sensor board 807, such as by the IMU's 902. The IMU's 902 include accelerometers and gyroscopes in an integrated circuit chip to provide the required seat angle measurements to the load level controller 806, which adjusts the seat angle via the leveling motor 805.

Turning back to FIGS. 1 and 2, the main drive controller 820 may be in communication with a software application 102 running on a remote communication device 850, such as a smartphone. The remote communication device 850 may connect to the stairlift 22 wirelessly, and in particular to the main drive controller 820 via a local communication protocol, such as Bluetooth or the like, which couples via a connectivity access point, such as a gateway module 830.

In one embodiment, the gateway module 830 may be integrated with or otherwise part of the main drive controller 820, and provides the interface between the mobile communication device 850 and the main drive controller 820. Further, a separate dongle 832 coupled to the main drive controller 820 via a connector may provide authorization and permit communication with and/or activation of the software in gateway module 830. This may be done for reasons of security and safety and so that only authorized personnel can connect to the main drive controller. A thumb-drive or other medium may be removably coupled to the main drive controller 820 to provide the gateway module 830.

In another embodiment, the gateway module 830 may be separate from the main drive controller 820 and/or the stairlift 22 and may be provided as a separate plug-in module provided by the installer or technician.

The connectivity system 20, 120 can enable live data sharing and remote system access by appropriate personnel, such as the installer or service technician. The service technician or other authorized user can gain access to all diagnostic and related information using the remote communication device 850 or other remote device.

In the embodiment of FIG. 1, connectivity may be wireless to the remote communication device 850 operatively coupled to the stairlift 22 or to the main drive controller 820, for example, within the Bluetooth broadcast range of the connectivity components.

Figure 2:
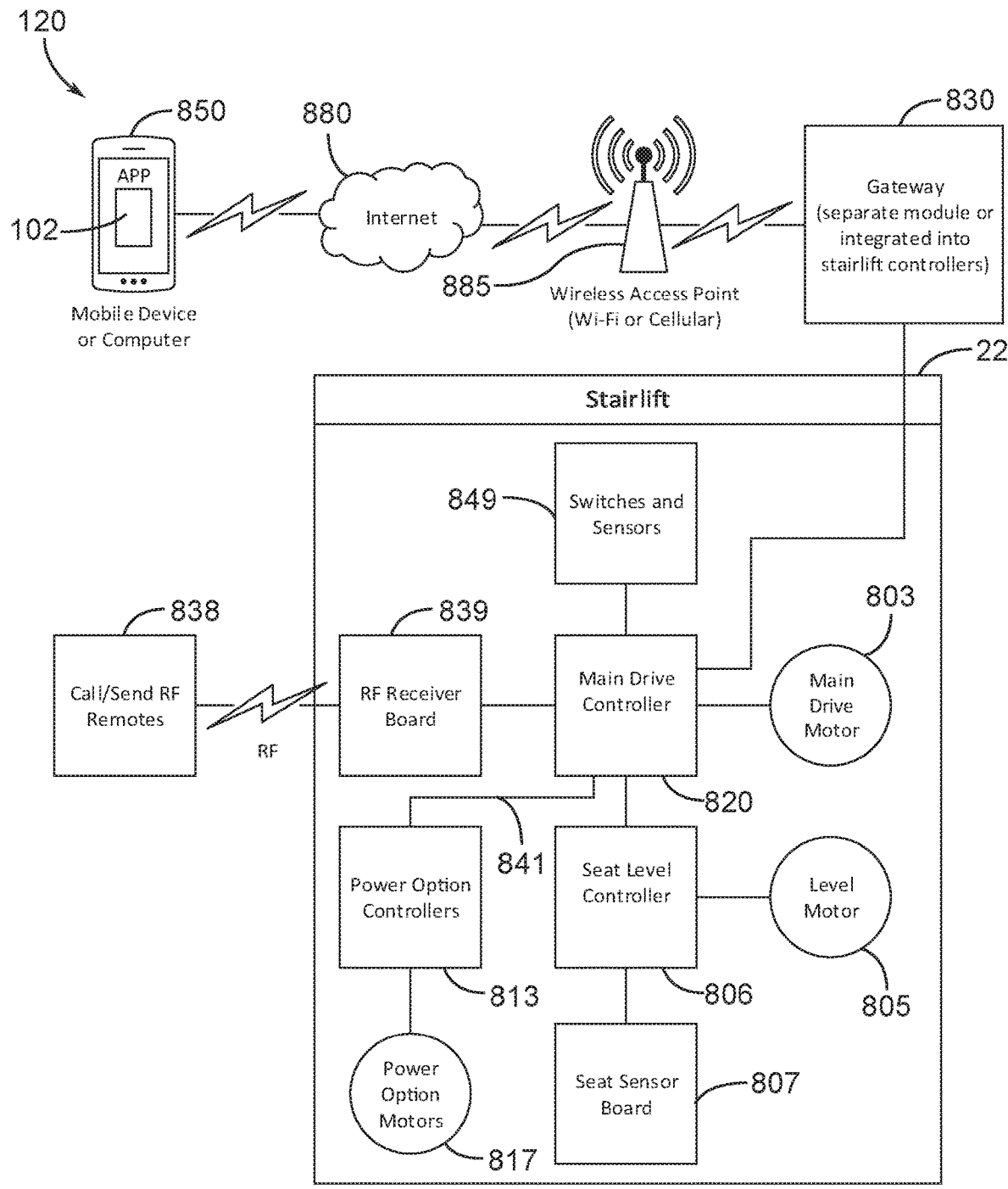
FIG. 2 is a high-level block diagram of a multi-function stairlift connectivity system using a cellular or Wi-Fi communications network according to an alternate embodiment.

In the alternate embodiment of FIG. 2, local wireless connectivity can be a link in a long-distance remote access capability, allowing a technician or other individual access via a cloud-based or other long-range communication system 885 to which the local connectivity system is linked. In the embodiment of FIG. 2, the multi-function stairlift connectivity system 120 communicates with the remote communication device 850 via a long-range network, such as the Internet 880 or the like. One or more wireless access points 885 can be used for connecting to the gateway module 830.

As described above with respect to FIG. 1, the remote communication device 850 may connect wirelessly to the stairlift 22 on-site via the application 102 running on the remote communication device 850 so as to provide access to a variety of data and settings in the stairlift 22, including for example, diagnostic information, system status data, faults, drive performance data, and the like.

The application 102 may also provide access and control to configure parameters in one or more controllers, such as the main drive controller 820, the load level controller 806, and one or more power option controllers 813, during installation, maintenance, and repair of the stairlift 22. In some implementations, the application 102 also can enable control of the stairlift 22 by a stairlift end user (for example, a rider).

The multi-function stairlift connectivity system 20 of FIG. 1 may utilize the main drive controller 820 as a central control device to provide various functions, such as aggregation and collection of data, location, settings, power measurements, and the like. After collecting and storing such information, the main drive controller 820, when coupled to the application 102, may transmit some or all of the collected information via the applicable communication protocol to the remote communication device 850.

Information regarding the stairlift 22 is preferably transmitted wirelessly, and may include all information otherwise available to the installer or technician having physical access to the connectivity system 20, such as data corresponding to switches, sensors, controllers, boards, detectors, motors and the like. To facilitate data access and data transfer between the remote communication device 850 and the main drive controller 820, an RS-485 transceiver may be used 760 (FIGS. 7A-B) within the circuitry of the main drive controller 820.

As described above, the main drive controller 820 is in communication with various motors, switches, and power components. As a primary function the main drive controller 820 is responsible for controlling movement of the carriage 28 via the main motor 803, while load leveling is performed by the leveling motor 805 via the load level controller 806, with input from the seat level sensor board 807.

Additionally, as shown in FIGS. 1 and 2, the main drive controller 820 may be operatively coupled to the one or more power option controllers 813, which in turn, control one or more power option motors 817, respectively. Such power option motors may control the footrest 52 (power lift/lower function), power seat swivel, and the like, depending on the features included in the particular installation. A power swivel function in some embodiments may stop movement of the carriage 28 to operate the power swiveling of the load support 40, for example in applications where physical space in the installation is limited.

As described above, data from all of the switches and sensors, including all input data and output data, is available to the main drive controller 820, and essentially provides full operational status with respect to status, faults, and other operational parameters. Such complete information may be made available to the remote communication device 850 when coupled to the main drive controller 820 via the appropriate communication format and application 102. Data, metrics, various parameters may be measured, monitored and/or collected at various points and from various components of the stairlift 22. Preferably, the main drive controller 820 is the ultimate recipient of such information.

The application 102 running on the remote communication device or remote communication device 850 may display a graphical user interface (GUI) to the technician or installer. Preferably, the remote communication device 850 provides a keyboard/virtual keyboard, a touchscreen, and the like. Alternatively, the remote communication device 850 may be a tablet or other computer device having a touchpad, pointing device and/or other input/output components.

Turning now to FIG. 13, the application 102 may provide a plurality of menu screens on the display screen, regardless of the specific type of remote communication device 850. As shown in FIG. 13, a main menu screen 1300 is shown, which may include a pairing selection 1302, a system status selection 1304, an installation selection 1306, a call/send selection 1308, a monitor mode selection 1310, an advanced configuration selection 1312, a partner selection 1314, and a close application selection 1316.

FIG. 14 shown a pairing screen 1402, which is displayed when the pairing selection 1302 of FIG. 13 is made. Pairing the remote communication device 850 with the gateway module 830 essentially connects the remote communication device 850 for operative communication with the main drive controller 820. Whether during installation or at a later time, the remote communication device 850 may be paired to provide the stairlift data and control as described above.

Turning now to FIGS. 15-18, FIG. 15 shows an installation screen 1502, which may be displayed in response to selecting the installation selection 1306 of FIG. 13. When installing the stairlift 22 at a particular facility, various chairlift options may or may not be installed. Such installed or non-installed features may be reflected in the installation screen 1502 of FIG. 15. The installation screen 1502 may include buttons for configuring the stairlift 22 to reflect a power seat swivel option 1506, a preset swivel/fixed footrest option 1508, and a left/right directionality option 1510.

FIG. 16 shows a call/send screen 1602, which may be displayed in response to selecting the call/send selection 1308 of FIG. 13. The call/send selection corresponds to the user hand-held remote call unit 838 having two button functionality, which the passenger may use to call the carriage 28 to the top or bottom landing position along the rails 24. Using this screen 1602, the installer may select the RF channel 1606 (one of sixteen different RF channels in the 2.4 GHz IEEE 802.15.4 band). A pair button 1608 and reset button 1610 may be used to pair the hand-held remote call unit 838 and reset the hand-held remote call unit 838, respectively.

FIG. 17 shows an advanced configuration screen 1702, which may be displayed in response to selecting the advanced configuration selection 1312 of FIG. 13. This screen 1702 permits the installer to specify certain software parameters, such as speed of the carriage 28 (based on main drive motor 803 operation), voltage fault threshold, and the like. A passcode protection box 1704 is provided so that installers and dealers cannot access these parameters without authorization from the manufacturer.

When a technician or installer initially installs the stairlift 22, an initial step may include testing to verify that all of the safety switches and sensors are operational and are functioning properly.

Turning now to FIGS. 18-30, these figures show multiple different system status screens, which may be displayed in response to selecting the system status selection 1304 of FIG. 13. The system status screens of FIGS. 18-30 permit the technician or installer to verify that the stairlift 22 is operating properly, and provides a means for testing and verifying all of the multiple safety switches and sensors for proper operation and functioning. For example, the installer may press various buttons and switches on the stairlift 22 and observe the stairlift 22 executes the expected operation, such as moving, stopping, and the like. This should also be reflected in the appropriate system status screens of FIGS. 18-30.

Figure 18:
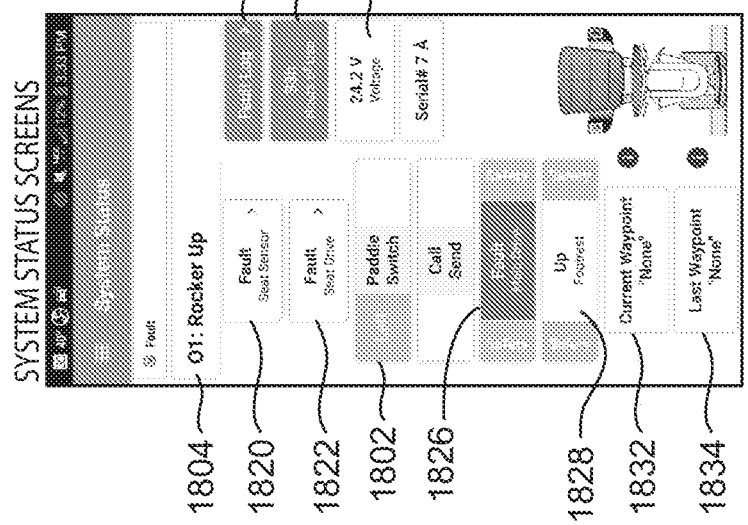

As shown in FIG. 18, the installer may press the rocker up button (same as the armrest paddle switch-leftward) on the carriage 28 to initiate forward or upward movement of the carriage 28 along the rail 24. The status of the switch will then be displayed for the rocker up button 1802. The specific function code for the rocker up button is shown as 1804. All faults detected may be recorded to a fault log by the main drive controller 820, as shown by the fault log menu option 1812 along with an indication of the cumulative time in use 1816. If a fault is detected, the fault may be indicated as a seat sensor fault 1820, a seat drive fault 1822, a main drive fault 1826, or a footrest fault 1828. Also indicated are the current waypoint indicator 1832, last waypoint indicator 1834 and system voltage level 1838.

The fault log 1812 may provide access to background monitoring and fault/operational recording, which may include recording a live, time-stamped history of all the input/output changes, faults, commands, states, and communications of the controllers in the stairlift 22, which may be necessary for one or more controllers to interact and function as a system. This recording log can be reviewed by a technician, for example, during installation, maintenance, or troubleshooting. Such a monitoring mode could, for example, identify when the lift is starting and stopping frequently due to an intermittent switch connection, thus making troubleshooting easier because the problematic input switch can be easily identified.

Figure 19:
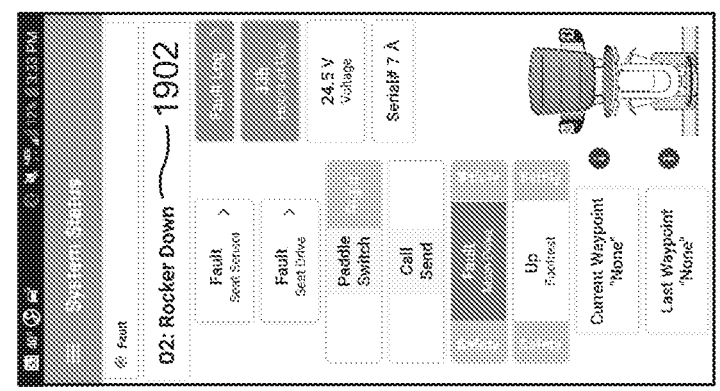

FIG. 19 shows a similar screen to FIG. 18 but instead is directed to the rocker down button 1902 along with the rightward armrest paddle switch.

Figure 20:
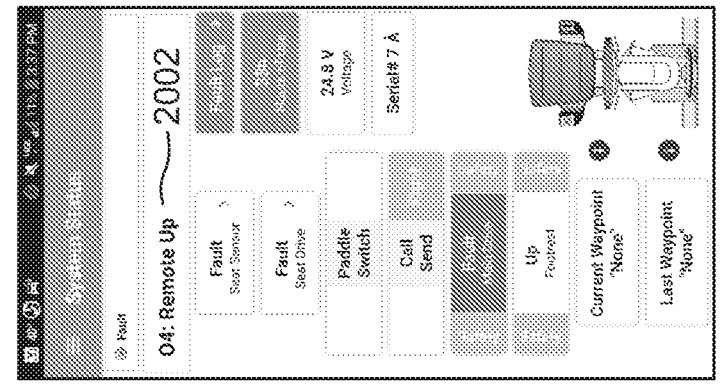

FIG. 20 shows a similar screen to FIG. 18 but instead is directed to the remote up button 2002, which is used to test functionality of the hand-held remote call unit 838 having two button functionality (up/down).

Figure 21:
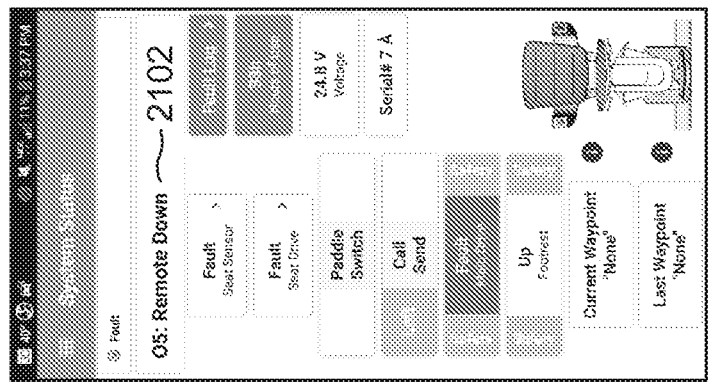

FIG. 21 shows a similar screen to FIG. 18 but instead is directed to the remote down button 2102, which is used to test functionality of the hand-held remote call unit 838 having two button functionality (up/down).

Figure 22:
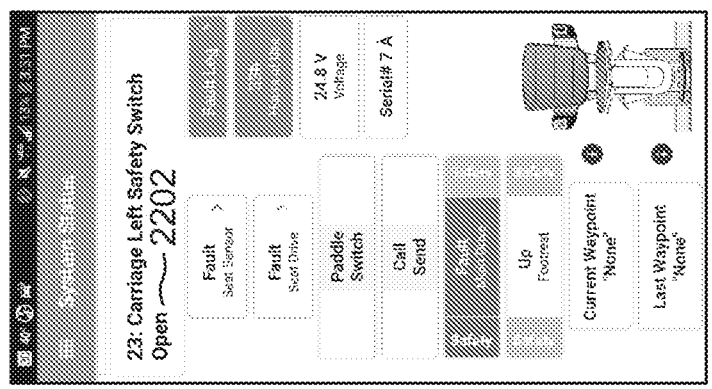

FIG. 22 shows a similar screen to FIG. 18 but instead is directed to the carriage left side safety switches 2202 (see FIG. 10), which provide a safety mechanism should the carriage 28 encounter an obstacle.

Figure 23:
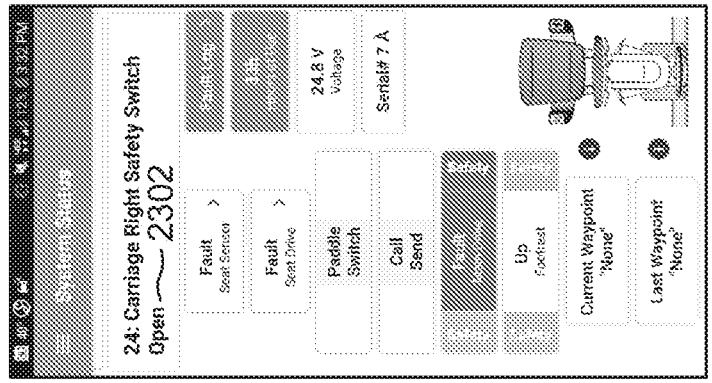

FIG. 23 shows a similar screen to FIG. 18 but instead is directed to the carriage right side safety switches 2302 (see FIG. 10), which provide a safety mechanism should the carriage 28 encounter an obstacle.

Figure 24:
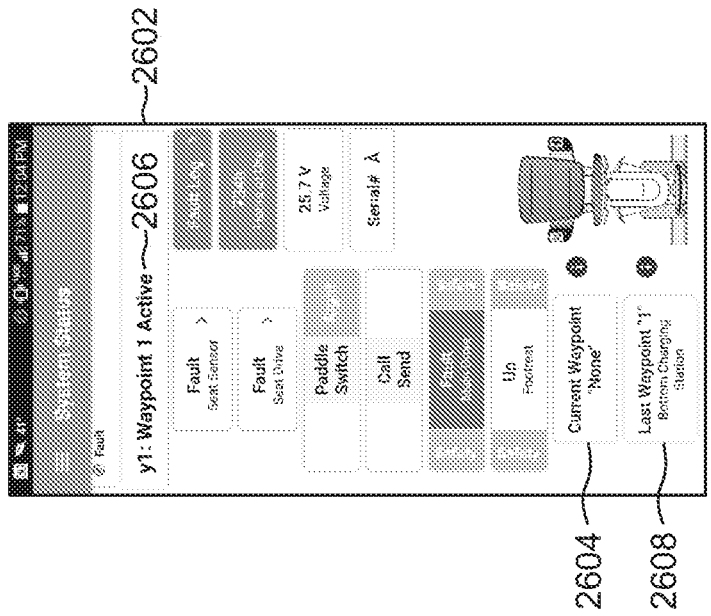

FIG. 24 shows a similar screen to FIG. 18 but instead is directed to the footrest left side safety switch 2402 (see FIG. 10), which provides a safety mechanism should the footrest encounter an obstacle.

Figure 25:
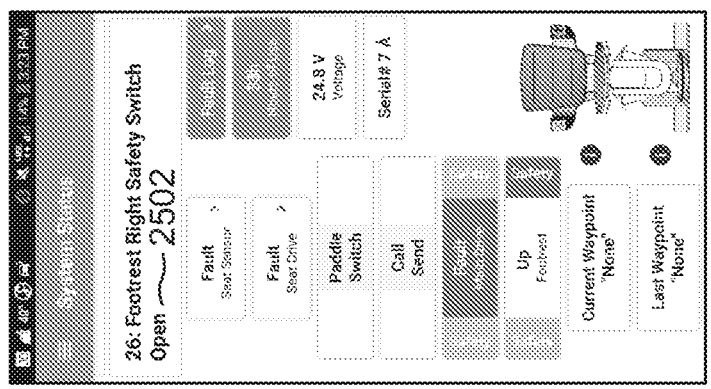

FIG. 25 shows a similar screen to FIG. 18 but instead is directed to the footrest right side safety switch 2502 (see FIG. 10), which provides a safety mechanism should the footrest encounter an obstacle.

Figure 26:
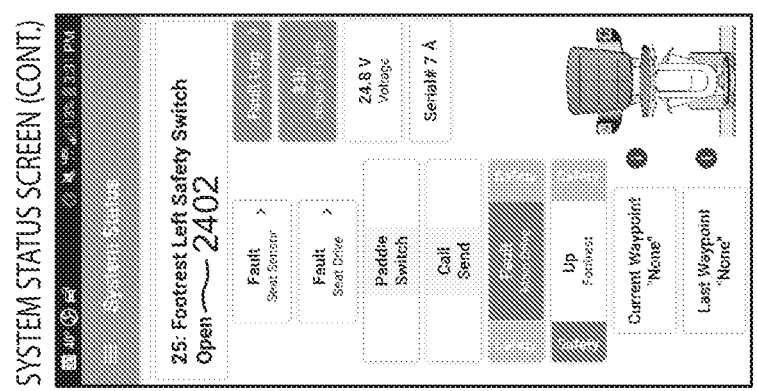

FIG. 26 shows a similar screen to FIG. 18 but instead is directed to waypoint determination. The installer may direct the carriage 28 to move in a particular direction and when a waypoint is reached, that waypoint will be indicated on the screen 2602. All of the various waypoints 1030 may be tested in this manner to ensure that each waypoint is recognized. For example, if the carriage 28 is positioned on a selected waypoint, that waypoint number will be reflected in the current waypoint indication 2604 and an indication that it is active 2606. Once the carriage 28 moves past a selected waypoint, that waypoint number will be reflected in the last waypoint indication 2608.

Figures 27, 28, 29:
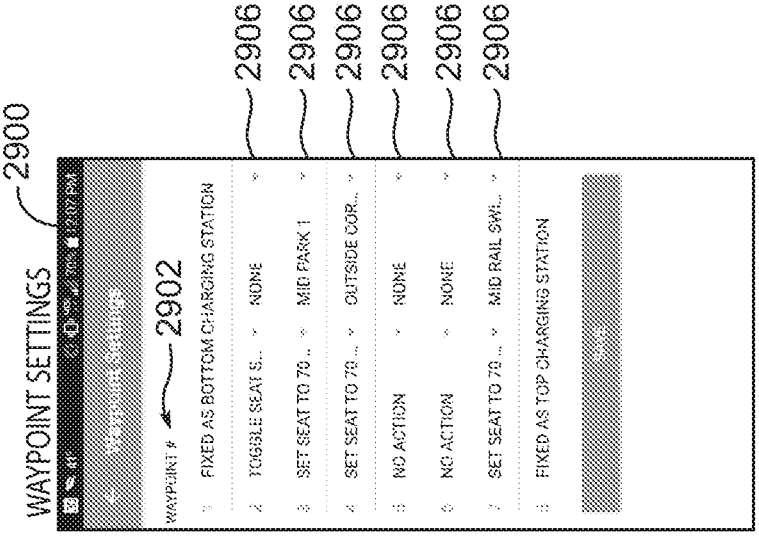

FIGS. 27-28 show additional waypoint marker installation and testing screens to provide additional detail regarding waypoint status. FIG. 27 provides additional information 2702 regarding a current waypoint and FIG. 28 provides additional information 2802 regarding a last or prior waypoint.

FIG. 29 shows an installation programming screen 2900 or waypoint setting screen that permits the installer to specify particular actions taken by the connectivity system 20, 120 when a particular waypoint has been reached. Eight waypoints are shown in the figure noted as waypoint #1 through waypoint #8 (2902). However, any suitable number of waypoint markers 1030 may be used, and each reflected in the waypoint setting screen 2900. For each waypoint number 2902, a dropdown menu may be provided by clicking on the downwardly facing triangular icon 2906.

The dropdown menus are not shown for reasons of clarity, but permits the installer to specify certain actions or movements taken relative to each of the waypoints. For example, at waypoint 5, the rail 24 may be configured with a very tight turn due to limited space in the installation. Thus, the connectivity system 20, 120 may be programmed using screen 2900 stop the carriage 28 for one second, for example, once waypoint 5 is reached, and then execute a swivel so that the carriage 28 rotates to face the downhill direction, then move up the rail 24, and then swivel back to the normal position. Any suitable movements and operations may be programmed on a waypoint-by-waypoint basis depending on the rail configuration.

Figures 30, 31, 32:
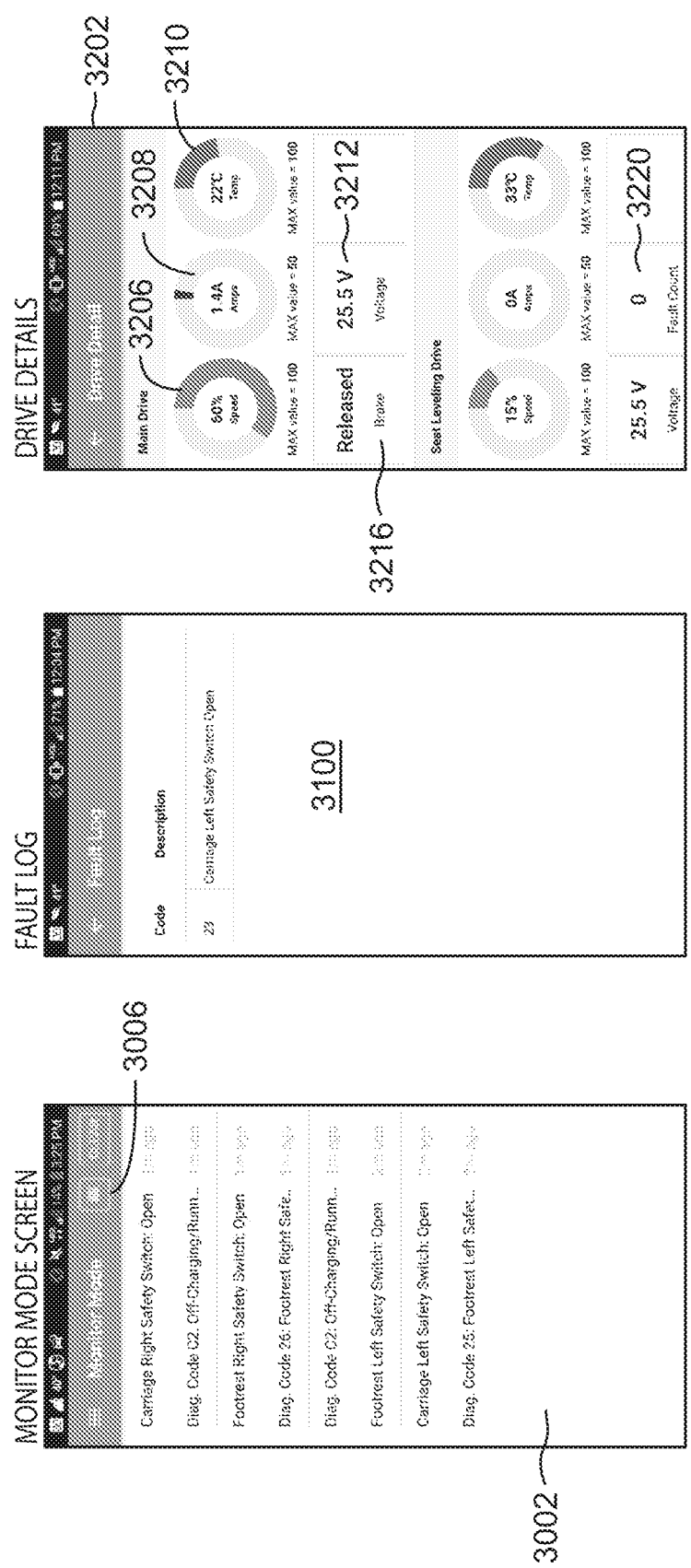

Turning now to FIGS. 30-32, FIG. 30 provides a monitor mode screen 3002, which may provide a listing of every command executed during installation or troubleshooting. This log of commands may be emailed or otherwise forwarded to engineering personnel for further in-depth review by use of the email button 3006, so as to assist in troubleshooting.

FIG. 31 shows a fault log screen 3100, which displays a list of specific faults that occur even when the application 102 is not necessarily operatively coupled to the stairlift 22. FIG. 32 show a drive detail screen 3202, which provides information regarding the operational parameters of the different motors in the connectivity system 20, 120, such as the main drive motor 803 and the seat level motor 805. For example, shown are percent of maximum speed 3206, current draw 3208, operating temperature 3210, voltage level 3212, brake status 3216, and number of faults 3220.

Multi-function stairlift connectivity includes a stairlift data collection system having data collection devices communicatively connected to a main controller. Such data collection devices may include sensors, switches, controllers, detectors, control boards, and location detectors providing data and settings in a stairlift (e.g., diagnostic information, system status data, faults, drive performance data). A communication module receives collected stairlift data and communicates wirelessly with a remote communication device. Waypoint detection may include carriage position detection employing electrical contacts on a carriage. Carriage position can be determined when the carriage stops at or passes a waypoint marker that includes electrical contacts connected to a waypoint element possessing a detectable electromagnetic characteristic (e.g., an identifiable resistive value). Where resistive value are used, waypoint locations can be determined by using a different resistive value for each waypoint.

Many modifications and other embodiments of the disclosure set forth herein will come to mind to one skilled in the art to which these disclosed embodiments pertain having the benefit of the teachings presented in the foregoing descriptions and the associated drawings. Therefore, it is to be understood that the disclosure is not to be limited to the specific embodiments disclosed herein and that modifications and other embodiments are intended to be included within the scope of the disclosure. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure. In this regard, for example, different combinations of elements and/or functions than those explicitly described above are also contemplated within the scope of the disclosure. Although specific terms are employed herein, they are used in a generic and descriptive sense only and not for purposes of limitation.

While particular embodiments are illustrated in and described with respect to the drawings, it is envisioned that those skilled in the art may devise various modifications without departing from the spirit and scope of the appended claims. It will therefore be appreciated that the scope of the disclosure and the appended claims is not limited to the specific embodiments illustrated in and discussed with respect to the drawings and that modifications and other embodiments are intended to be included within the scope of the disclosure and appended drawings. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure and the appended claims.

What is claimed is:

1. A multi-function stairlift connectivity system comprising:
    a stairlift including a rail, a carriage configured to move along the rail, and a pair of carriage electrical contacts, the carriage including:
    a main drive motor configured to engage the rail to move the carriage along the rail;
    a main drive controller configured to control operation of the main drive motor;
    a seat operatively mounted to the main drive motor; and
    a stairlift data collection system including:
    a plurality of data collection devices in operative communication with the main drive controller, the plurality of data collection devices including one or more sensors;
    a plurality of waypoint markers located at predetermined positions along the rail, each waypoint marker including a pair of waypoint marker electrical contacts and a resistive element having a resistive value, the waypoint markers configured to electrically connect to the pair of carriage electrical contacts, wherein the main drive controller is configured to determine a position of the carriage along the rail when the carriage stops at or passes the waypoint marker by identifying the resistive value of the corresponding waypoint marker;
    a communication module configured to receive stairlift collected data from the plurality of data collection devices; and
    a remote communication device configured to communicate wirelessly with the communication module, the remote communication device configured to receive the stairlift collected data, and to provide signals to the main drive controller via the communication module to remotely control operation of the main drive motor.

2. The system of claim 1, further comprising a waypoint reader operatively coupled to the main drive controller and configured to determine a position of the carriage along the rail by identifying each of the plurality of waypoint markers without use of an encoder to for establishing a position of the carriage along the rail.

3. The system of claim 1, wherein the stairlift further comprises a charging station including a pair of charging station electrical contacts configured to electrically connect the pair of carriage electrical contacts to a recharging power supply when the carriage stops at the charging station.

4. The system of claim 3, wherein each resistive value is different.

5. The system of claim 3, wherein the charging station is located at a top terminus of the rail or is located at a bottom terminus of the rail.

6. The system of claim 1,
wherein the carriage further includes an electromagnetic detector; and
each waypoint marker includes a detection element possessing an identifiable electromagnetic characteristic, wherein the identifiable electromagnetic characteristic is detected by the electromagnetic detector when the carriage stops at or passes the waypoint marker, and
wherein detection of the identifiable electromagnetic characteristic by the electromagnetic detector is processed by the carriage to determine a carriage location on the rail.

7. The system of claim 1, including a seat leveling motor operatively coupled to a seat level controller, the seat level controller in operative communication with the main drive controller.

8. The system of claim 7, wherein the seat level controller receives signals so as to determine a roll angle, a pitch angle, and a yaw angle of the seat, and the seat level controller maintains the seat in a substantially horizontal position based on the determined roll angle, pitch angle, and yaw angle.

9. The system of claim 8, wherein a fault is declared if the seat level controller determines that the seat deviates from horizontal by more than a predetermined amount.

10. The system of claim 7, wherein the seat level controller receives signals from an accelerometer and a gyroscopic device.

11. The system of claim 7, wherein the seat level controller maintains the seat in a substantially horizontal position as the seat travels along the rail having varying angles of inclination.

12. The system of claim 1, wherein forward and backward movement of the carriage along the rail is controlled remotely by a technician via the remote communication device.

13. The system of claim 1, wherein one or more paddle switches of the carriage and one or more barrier arm switches of the carriage are controlled remotely by a technician via the remote communication device.

14. The system of claim 1, wherein the main drive controller generates a fault log that includes a time-stamped history of input/output changes, commands, status information, and fault information.

15. The system of claim 14, wherein the remote communication device remotely accesses the fault log and displays a least a portion of the fault log on a display screen of the remote communication device.

16. The system of claim 1, further comprising a mechanical overspeed sensor operatively coupled to the main drive controller.

17. The system of claim 16, wherein the mechanical overspeed sensor is based on physical contact between a wheel or roller on the carriage and a portion of the rail along which the carriage travels.

18. The system of claim 1, wherein
the plurality of data collection devices comprises two or more of the following: a sensor, a switch, an optical detector, a waypoint and charging station detector, a control board and a controller.

19. A multi-function stairlift connectivity system comprising:
a stairlift including a rail, and a carriage configured to move along the rail, the carriage including:
a main drive motor configured to engage the rail to move the carriage along the rail,
a main drive controller configured to control operation of the main drive motor,
a seat operatively mounted to the main drive motor, and
a seat leveling motor operatively coupled to a seat level controller, the seat level controller configured to maintain the seat in a substantially horizontal position based on signals from an accelerometer and/or a gyroscopic device; and
a stairlift data collection system including:
a plurality of data collection devices in operative communication with the main drive controller, the plurality of data collection devices including one or more sensors;
a plurality of waypoint markers located at predetermined positions along the rail;
a communication module configured to receive stairlift collected data from the plurality of data collection devices; and
a remote communication device configured to communicate wirelessly with the communication module, the remote communication device configured to receive the stairlift collected data, and to provide signals to the main drive controller via the communication module to remotely control operation of the main drive motor.

20. The system of claim 19, wherein the seat level controller receives signals so as to determine a roll angle, a pitch angle, and a yaw angle of the seat.

21. The system of claim 19, wherein the seat level controller receives signals from an accelerometer and a gyroscopic device.

22. The system of claim 20, wherein the seat level controller maintains the seat in a substantially horizontal position based on the determined roll angle, pitch angle, and yaw angle, and the seat level controller maintains the seat in a substantially horizontal position as the seat travels along the rail having varying angles of inclination.

23. The system of claim 22, wherein a fault is declared if the seat level controller determines that the seat deviates from horizontal by more than a predetermined amount.

* * * * *

UNITED STATES PATENT AND TRADEMARK OFFICE
CERTIFICATE OF CORRECTION

PATENT NO. : 12,208,993 B2
APPLICATION NO. : 17/595868
DATED : January 28, 2025
INVENTOR(S) : Lampe et al.

Page 1 of 1

It is certified that error appears in the above-identified patent and that said Letters Patent is hereby corrected as shown below:

In the Claims

In Column 15, Claim 2, Line 2, delete "to for" and insert -- for --, therefor.

In Column 16, Claim 15, Line 1, delete "a least" and insert -- at least --, therefor.

Signed and Sealed this
Eleventh Day of March, 2025

Coke Morgan Stewart
*Acting Director of the United States Patent and Trademark Office*